US008239759B1

(12) United States Patent
Sundermeyer

(10) Patent No.: US 8,239,759 B1
(45) Date of Patent: Aug. 7, 2012

(54) SYSTEM AND METHOD FOR EDITING DOCUMENTS USING STORED COMMANDS

(75) Inventor: Ken Sundermeyer, Belmont, CA (US)

(73) Assignee: Adobe Systems, Inc., San Jose, CA (US)

( * ) Notice: Subject to any disclaimer, the term of this patent is extended or adjusted under 35 U.S.C. 154(b) by 1722 days.

(21) Appl. No.: 10/283,868

(22) Filed: Oct. 30, 2002

Related U.S. Application Data

(60) Provisional application No. 60/333,840, filed on Nov. 27, 2001.

(51) Int. Cl.
*G06F 17/00* (2006.01)
(52) U.S. Cl. ........................................ 715/255
(58) Field of Classification Search .................. 715/513, 715/501.1, 530, 500, 200, 255
See application file for complete search history.

(56) References Cited

U.S. PATENT DOCUMENTS

| | | | | |
|---|---|---|---|---|
| 5,367,635 A * | 11/1994 | Bauer et al. | ...................... | 709/221 |
| 5,537,528 A * | 7/1996 | Takahashi et al. | ............ | 715/255 |
| 5,671,428 A * | 9/1997 | Muranaga et al. | ............ | 715/751 |
| 5,694,610 A * | 12/1997 | Habib et al. | .................... | 715/531 |
| 5,724,595 A * | 3/1998 | Gentner | ...................... | 715/501.1 |
| 5,742,845 A * | 4/1998 | Wagner | ............................ | 710/11 |
| 5,835,769 A * | 11/1998 | Jervis et al. | ..................... | 717/113 |
| 5,862,395 A * | 1/1999 | Bier | ................................. | 712/1 |
| 5,999,213 A * | 12/1999 | Tsushima et al. | ............ | 348/180 |
| 6,086,617 A * | 7/2000 | Waldon et al. | ..................... | 703/2 |
| 6,185,591 B1 * | 2/2001 | Baker et al. | ..................... | 715/531 |
| 6,202,073 B1 * | 3/2001 | Takahashi | ...................... | 715/517 |
| 6,259,444 B1 * | 7/2001 | Palmer et al. | ................. | 715/866 |
| 6,308,198 B1 * | 10/2001 | Uhler et al. | .................... | 709/200 |
| 6,311,323 B1 * | 10/2001 | Shulman et al. | ............... | 717/111 |
| 6,563,913 B1 * | 5/2003 | Kaghazian | ................. | 379/93.24 |
| 6,581,095 B1 * | 6/2003 | Kim | ............................... | 709/220 |
| 6,671,854 B1 * | 12/2003 | Dunsmoir et al. | ............. | 715/513 |
| 6,701,308 B1 * | 3/2004 | Chen et al. | ......................... | 707/3 |
| 6,721,727 B2 * | 4/2004 | Chau et al. | ......................... | 707/3 |
| 6,748,397 B2 * | 6/2004 | Choi | ...................................... | 1/1 |
| 6,760,884 B1 * | 7/2004 | Vertelney et al. | ........... | 715/500.1 |
| 6,792,575 B1 * | 9/2004 | Samaniego et al. | ............ | 715/513 |
| 6,804,666 B2 * | 10/2004 | Morita et al. | ....................... | 707/3 |
| 6,826,726 B2 * | 11/2004 | Hsing et al. | ..................... | 715/513 |
| 6,857,102 B1 * | 2/2005 | Bickmore et al. | .......... | 715/501.1 |
| 6,874,121 B1 * | 3/2005 | Mayer | ............................ | 715/513 |
| 6,954,282 B2 * | 10/2005 | Miyamoto et al. | ............ | 358/1.18 |
| 6,973,483 B2 * | 12/2005 | Hewett et al. | .................. | 709/213 |
| 6,986,154 B1 * | 1/2006 | Price et al. | ......................... | 725/46 |
| 7,096,420 B1 * | 8/2006 | Peikes | ............................ | 715/205 |
| 7,823,060 B2 * | 10/2010 | Mohamed | ...................... | 715/234 |
| 7,991,810 B2 * | 8/2011 | Kim et al. | ...................... | 345/902 |

(Continued)

OTHER PUBLICATIONS

Dushay, Localizing Experience of Digital Content via Structural Metadata, ACM 2002, pp. 244-252.*

(Continued)

*Primary Examiner* — Cong-Lac Huynh
(74) *Attorney, Agent, or Firm* — Fish & Richardson P.C.

(57) ABSTRACT

A system and method allows controlled editing of a document using stored commands and definitions. The author can identify an action: insert, delete or modify, and then select names of behaviors that control the insertion, deletion or modification of text into, from or inside a document. The system and method then performs the insertion, deletion or modification, allowing the author limited control as to the placement of insertions and the insertion or modification of certain parameters.

38 Claims, 9 Drawing Sheets

U.S. PATENT DOCUMENTS

| | | | |
|---|---|---|---|
| 2002/0052981 A1* | 5/2002 | Yasuda | 709/320 |
| 2002/0057286 A1* | 5/2002 | Markel et al. | 345/704 |
| 2002/0065676 A1* | 5/2002 | Grainger et al. | 705/1 |
| 2002/0083032 A1* | 6/2002 | Bourges-Sevenier | 707/1 |
| 2002/0168621 A1* | 11/2002 | Cook et al. | 434/350 |
| 2002/0184264 A1* | 12/2002 | Berg et al. | 707/513 |
| 2002/0188726 A1* | 12/2002 | Schick et al. | 709/227 |
| 2002/0196281 A1* | 12/2002 | Audleman et al. | 345/762 |
| 2003/0028540 A1* | 2/2003 | Lindberg et al. | 707/100 |
| 2003/0028850 A1* | 2/2003 | Quinn et al. | 715/530 |
| 2003/0115548 A1* | 6/2003 | Melgar | 715/513 |
| 2003/0126232 A1* | 7/2003 | Mogul et al. | 709/219 |
| 2003/0182402 A1* | 9/2003 | Goodman et al. | 709/220 |
| 2003/0195921 A1* | 10/2003 | Becker et al. | 709/200 |
| 2003/0197894 A1* | 10/2003 | Miyamoto et al. | 358/1.18 |
| 2003/0208498 A1* | 11/2003 | Feinberg et al. | 707/100 |
| 2003/0237048 A1* | 12/2003 | Jones et al. | 715/513 |
| 2003/0237049 A1* | 12/2003 | Sawicki et al. | 715/513 |
| 2004/0030951 A1* | 2/2004 | Armangau | 714/6 |
| 2004/0205340 A1* | 10/2004 | Shimbo et al. | 713/165 |
| 2004/0205551 A1* | 10/2004 | Santos | 715/513 |
| 2004/0239681 A1* | 12/2004 | Robotham et al. | 345/581 |
| 2006/0028689 A1* | 2/2006 | Perry et al. | 358/3.28 |
| 2006/0031391 A1* | 2/2006 | Balter et al. | 709/217 |
| 2006/0064634 A1* | 3/2006 | Dettinger et al. | 715/511 |
| 2006/0101042 A1* | 5/2006 | Wagner et al. | 707/101 |

OTHER PUBLICATIONS

Miller et al., Outlier Finding: Focusing User Attention on Possible Errors, Google 2001, pp. 81-90.*

Daly, Customizing Bibliographic Style Files, Google 1991, pp. 1-19.*

Comer et al., Shadow Editing: A Distributed Service for Supercomputer Access, IEEE 1988, pp. 215-221.*

* cited by examiner

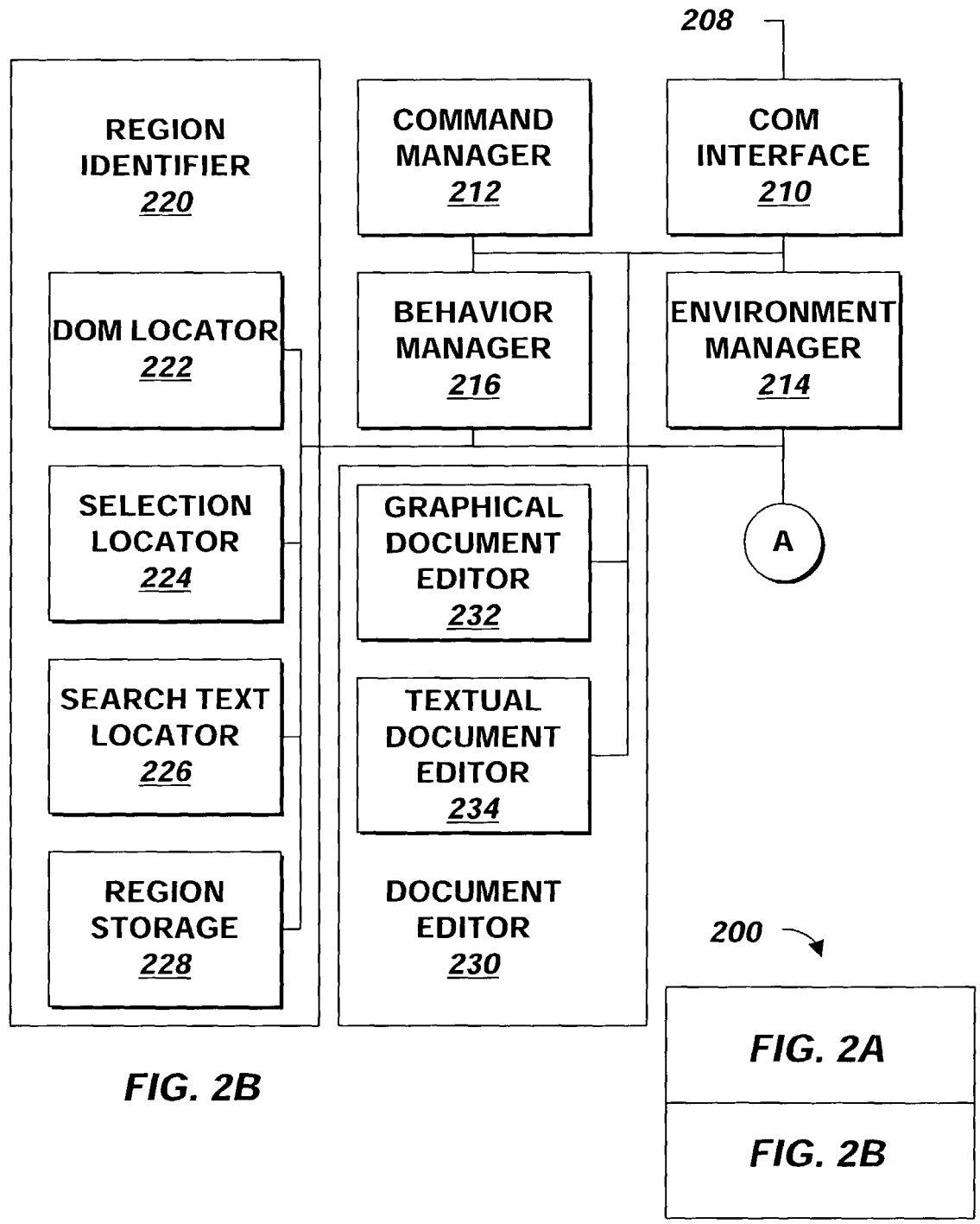

GROUP SOURCE FILE 500

GROUP 510

TITLE 520

GROUP PARTICIPANTS 530

GROUP PARTICIPANT 540

GROUP PARTICIPANT 542

GROUP PARTICIPANT 544

TRANSLATOR 670

SEARCH PATTERNS 674

TRANSLATIONS 676

TRANSLATION 680

OPEN TAG 690

ATTRIBUTES 691

ATTRIBUTE 693

ATTRIBUTE 694

DISPLAY 696

CLOSE TAG 698

TRANSLATION 682

TRANSLATION 684

TRANSLATION 686

*FIG. 6B*

SYSTEM AND METHOD FOR EDITING DOCUMENTS USING STORED COMMANDS

CROSS REFERENCE TO RELATED APPLICATIONS

This application claims the benefit of application Ser. No. 60/333,840 entitled, "Method and Apparatus for Editing Documents Using Stored Commands" filed on Nov. 27, 2001 by Ken Sundermeyer and is related to application Ser. No. 09/991,759 entitled, "System and Method for Editing Information" filed on Nov. 24, 2001 by Narcisso Jaramillo, and each is hereby incorporated by reference in its entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights rights whatsoever.

FIELD OF THE INVENTION

The present invention is related to computer software and more specifically to document management software tools.

BACKGROUND OF THE INVENTION

Documents are used to contain information. When a document is stored on a computer system, a document may correspond to one or more files or a part of a file. Documents may contain text, such as might be used as input to a word processing application program, but documents may contain other types of information. For example, a document may contain the source code for a web page. As used herein, a document is any collection of information stored in at least a part of one or more files.

Documents are sometimes edited using an authoring tool. For example, a document containing source code for a web page may be edited using a conventional web authoring tool, such as the conventional Dreamweaver 4 web authoring tool commercially available from Macromedia Corporation of San Francisco, Calif. Conventional web authoring tools simplify the process of document editing by allowing an author to specify the appearance of a web page and then translating the author's graphical specification into source code for a web page. In contrast to an authoring tool for a web page, an authoring tool for a word processing document may be used to edit a word processing document. Such a word processing authoring tool may include the conventional WORD FOR WINDOWS product commercially available from MICROSOFT CORPORATION of Redmond, Wash. Word processing authoring tools also simplify the process of document editing by providing a menu-based interface to documents to allow formatting to be easily specified.

Using each type of authoring tool, the author can request a change in the document and see the effect of the requested change on a graphical representation of the document. The author can thus use the authoring tool to incorporate complex instructions into the document without knowledge of their implementation details. Although the details of implementation must be used, for example, to cause a web page corresponding to a web page document to appear on a user's browser, because the authoring tool handles them, the author is not required to deal with them. For example, an author can draw a web page and rely on the web authoring tool to generate the HTML instructions corresponding to the web page: the author does not require even the faintest knowledge of the source code required to produce the web page he desires.

Some changes made to a document are particularly complex to incorporate into a document, or may not be easy to manipulate visually, even with the help of an authoring tool. For example, the source code for a web page may include server side code to be executed on a server before the web page is served to a user of the page. Conventional web authoring tools do not hide the implementation details of such changes: the author is required to know how to program the server side code to make even minor modifications to a web page containing server side code. Because even minor syntax errors can cause major problems to the server side code, experts in the programming language have been required to implement even minor changes to server side code using a web authoring tool.

Another example of changes made to a document requiring the services of an expert are legal documents. Even simple errors in a legal document can cause enormous problems. As a result, the services of an expert, such as an attorney, are frequently required to generate or alter legal documents.

There are several problems with the use of experts to generate or alter documents. Experts are often in short supply, making their services expensive to obtain and sometimes hard to obtain on short notice. Because of the expense, some changes are not made to documents because the change isn't worth the large cost, even though the change could be beneficial. Because the services may not be readily available, changes may be impossible to achieve as frequently as they are desired.

Libraries of pre-written portions of documents may be used to allow a non-expert to have access to the products of an expert by copying expert-written portions of the library into the document. However, merely copying parts of libraries can limit the use of the library to circumstances anticipated by the expert. Because as described above, a non-expert author may introduce problems into the document if the author attempts even minimal customization to match the circumstances at hand, libraries of pre-written portions of documents have limited usefulness.

The complexity of some changes is frequently exacerbated by different requirements under differing conditions. For example, a change implemented in one manner using one server side code language may require an entirely different approach if another server side code language is required. Similarly, a change to a legal document implemented under one state's rules may not apply in another state. Some experts may only be familiar with only a subset of the full range of knowledge, and this further specialty makes the services of the proper expert more difficult and more expensive to obtain.

Custom programmed solutions to the problems above could have solved some of the problems with libraries, but they would lack two benefits of libraries: it is easy for the expert to see what the change will look like and the expert can use a wide variety of commonly available authoring tools to produce the library, even if the expert does not have access to the authoring tool with which the library will be used.

What is needed is a system and method that can allow an author with limited or no knowledge of the details of implementation of additions, changes or deletions to implement such additions, changes or deletions, to a document and optionally customize any additions or changes without requiring the services of an expert, that uses instructions for which the operations performed by any addition, change or deletion are readily apparent and easy to modify using a variety of tools.

SUMMARY OF INVENTION

A system and method allows an expert to designate rules for incorporating changes into a document, allowing an author to properly implement the changes without requiring the use of an expert, even under differing sets of rules. The expert can program the system and method to allow the author to perform customization of the additions, changes or deletion without allowing the author more freedom than the expert is comfortable giving. The system and method receive instructions in an XML format in plain text documents to allow input to the system and method to be provided using commonly available authoring tools.

BRIEF DESCRIPTION OF THE DRAWINGS

FIG. 5 is a schematic diagram of a group definition file according to one embodiment of the present invention.

DETAILED DESCRIPTION OF A PREFERRED EMBODIMENT

Figure 1:
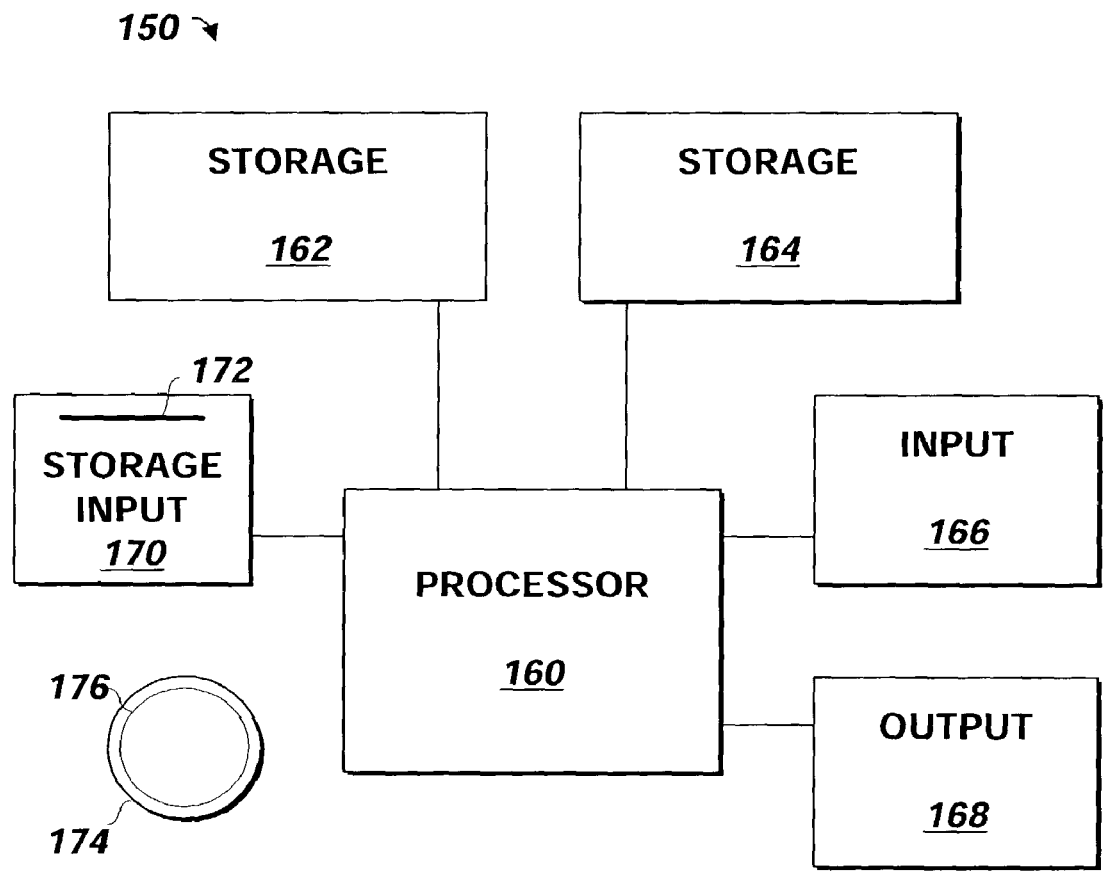
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the Solaris operating system commercially available from SUN MICROSYSTEMS of Mountain View, Calif., a Pentium-compatible personal computer system such as are available from DELL COMPUTER CORPORATION of Round Rock, Tex. running a version of the WINDOWS operating system (such as 95, 98, Me, XP, NT or 2000) commercially available from MICROSOFT CORPORATION of Redmond Wash. or a MACINTOSH computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. although other systems may be used.

Overview

The present invention is operated by two users: an editor, who specifies objects that may be inserted into a document, modified, or deleted under control of the system and method, and instructions that control their insertion, modification and deletion, and an author, who may insert, modify, and/or delete such objects. In this context an object may be, for example, a standard clause in a legal document or a portion or all of server-side code on a web page.

Configuration Files

As part of the creation of such an object and instructions, herein referred to as a "behavior", the editor creates one or more configuration files. In one embodiment, configuration files are plain text files, tagged using XML and include elements including tag names, attribute names and attribute values and data. A behavior is a set of instructions that cause one or more lines of a document to be added into, deleted from, or modified in, one or more documents.

In the XML embodiment, each behavior is defined in a separate XML file, called a group source file. "Group" is therefore considered a synonym of "behavior". The group source file contains entries that point to one or more participant source files, each describing a participant. As used herein, a participant is a contiguous block of text that can be inserted into, deleted from or modified in, a document using the system and method of the present invention. For example, a participant could be a paragraph of a contract, an image, or a contiguous block of code. Each participant has a name, which in one embodiment corresponds to the filename of the participant source file. Because a group source file can refer to more than one participant, one behavior can involve more than one participant, so by inserting a behavior in a document an author may in fact be inserting several separate paragraphs or other blocks of text into the document at several places in the document.

Figure 2A:
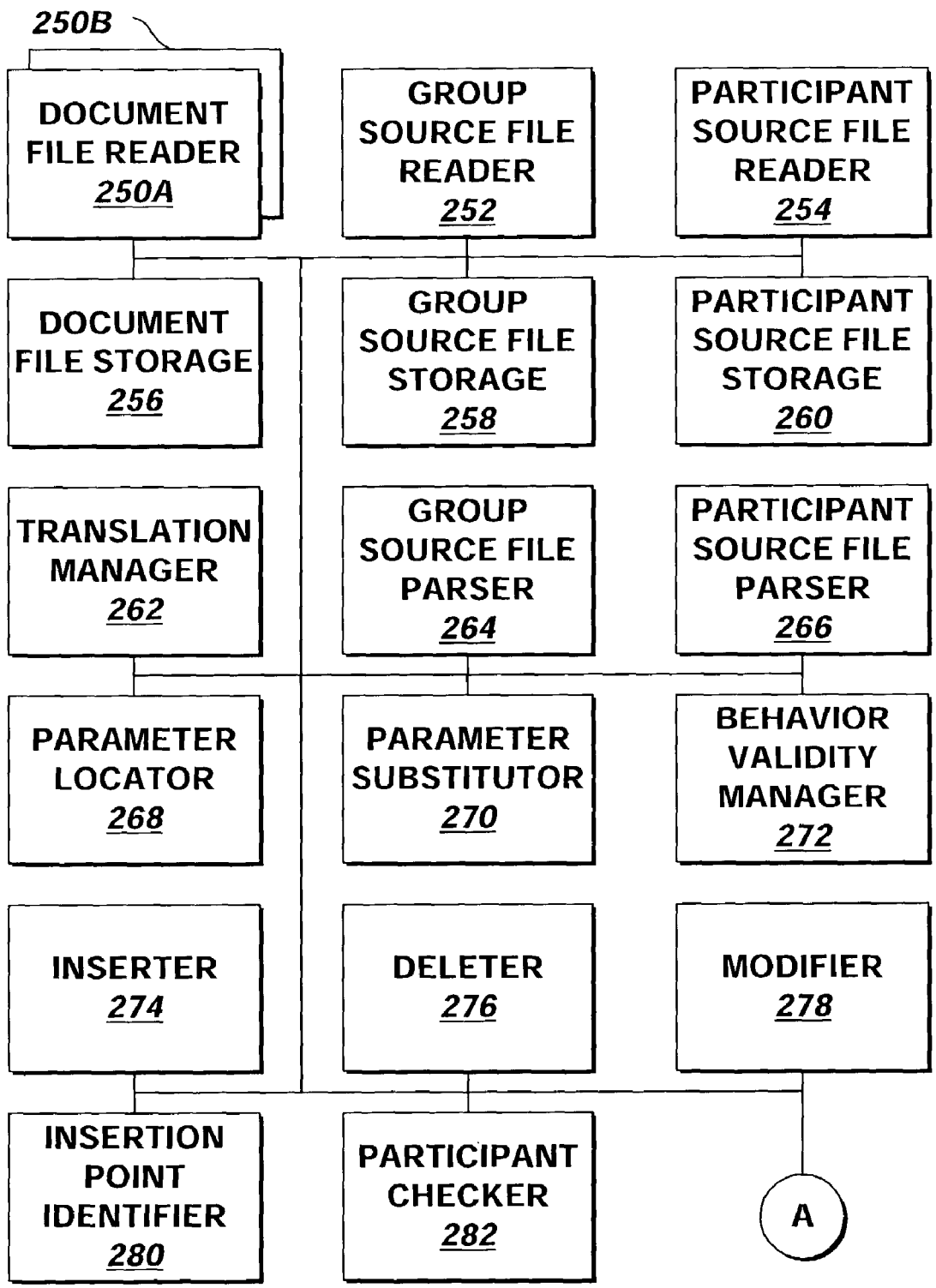
FIG. 2, consisting of FIGS. 2A and 2B, is a block schematic diagram of a system for inserting objects into, modifying objects in, and deleting objects from, a document according to one embodiment of the present invention.

FIGS. 2, 5, and 6 will now be described. FIG. 2, shows a block schematic diagram of a system 200 for inserting objects into, deleting objects from, and modifying objects in, a document according to one embodiment of the present invention.

Figure 6A:
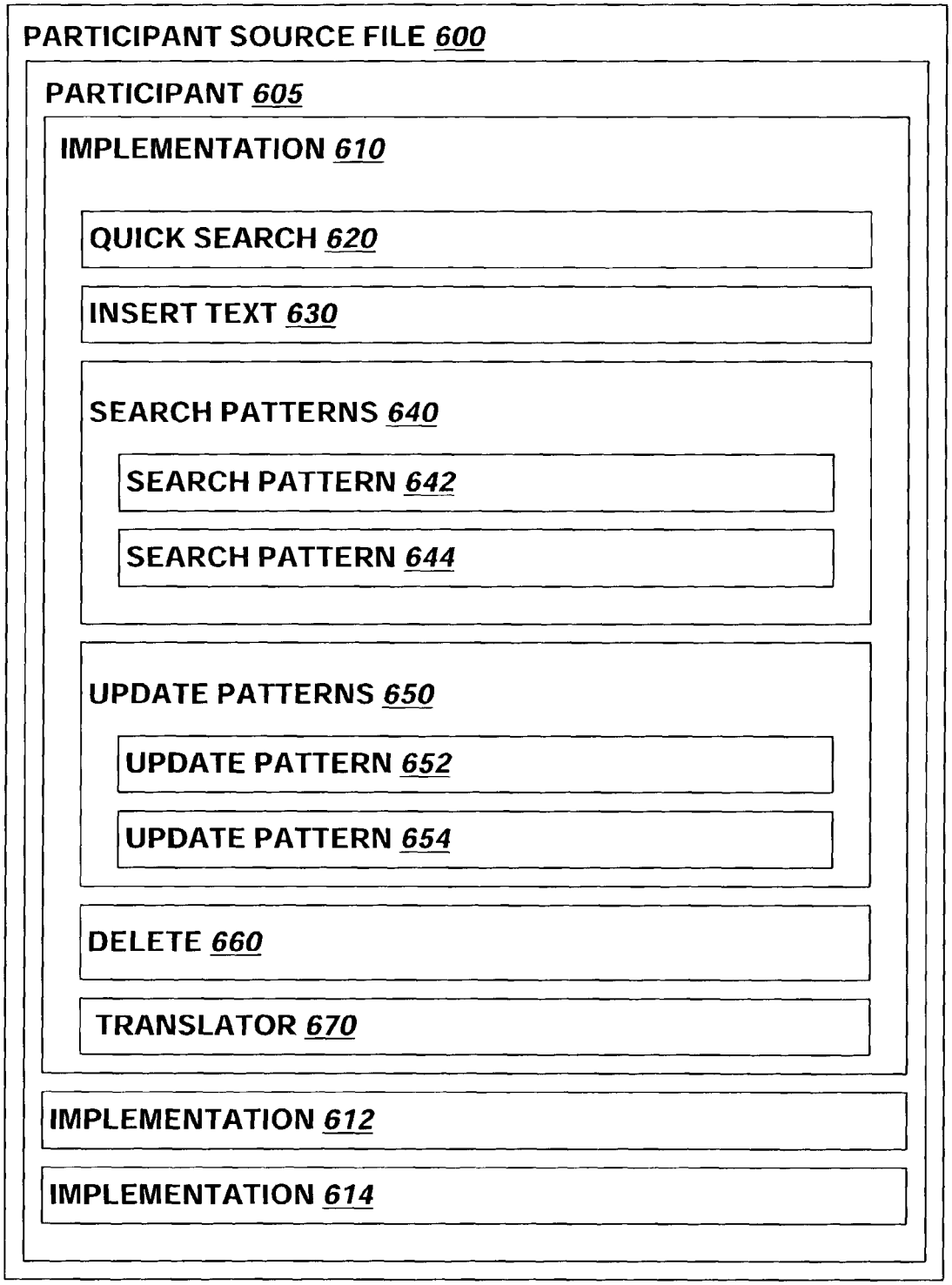
FIG. 6, consisting of FIGS. 6A and 6B, is a schematic diagram of a participant definition file according to one embodiment of the present invention.

FIG. 5 shows a block schematic diagram of a group source file according to one embodiment of the present invention. FIG. 6, consisting of FIGS. 6A and 6B, shows a block schematic diagram of a participant source file according to one embodiment of the present invention. In one embodiment, all user communication into or out of system 200 is made via input/output 208 of operating system 210 which is coupled to a keyboard, mouse, display screen, printer, and/or other conventional user input and output devices.

Overview of Group Source File.

In one embodiment, each group source file 500 is arranged using a format, which will now be described. Although the file formats described herein are representative file formats, the present invention may be applied to any number of files and file formats to be used as group source files and participant source files. The layout of a group source file is shown in Appendix A.

Each group source file 500 describes one group. The first line in the group source file 500 starts the group 510 and has a tag with a name of "group" and three optional attributes, specified as part of the group tag using name=value pairs. A serverBehavior attribute has a value corresponding to an executable file that can perform a check on the document to determine whether the server behavior may be used by the document the author is editing. A dataSource attribute has a value corresponding to the data source that this server behavior is expected to reference. A subType attribute has a value corresponding to a selection that may be made by the author when applying this server behavior, to distinguish between different versions of the same server behavior.

A group 510 contains one optional title 520, specified below the group tag as an element between a start tag "<title>" and an end tag "</title>". The title will be displayed as described below if the behavior applies to the document the author is editing when the author requests a menu of behaviors as described below.

A group 510 contains a group participants section 530, specified as a tag with a name of "groupParticipants" and optional selectParticipant attribute having a name selectParticipant and a value of a string containing a filename indicating which participant should be highlighted in the document when the group is selected from a menu as described below. The filename should end in ".xml", although the value of the selectParticipant attribute need not include the ".xml" extension in its value.

The group participants section 530 then contains at least one participant 540-544 between the groupParticipants start tag and a groupParticipants end tag which comes before the group end tag (although only three are shown in the Figure, any number greater than one may be used), specified using a tag having the name "groupParticipant" and two attributes "name" and "partType". The value of the name attribute is a string specifying the name (without the ".xml" extension) of a participant file described below. The value of the partType attribute specifies the type of the participant. A participant may be specified with a type of "identifier", indicating the participant identifies the entire group. If the participant is found in the document as described below, the group is considered to exist even if the other group participants specified in the group are not located in the document. A participant may be specified with a type of "member". If this type of participant is found in the document by itself, it does not identify the group, although if the participant is not found, the group is incomplete as described below. A participant may be specified with a type "option", which implies that the participant could be found in the document, but need not be found in the document for the group to be complete. A participant may be specified with a type, "multiple". Such a participant is optional in the group, and there may be multiple copies associated with the server behavior. A participant may be specified with a type, "data", which may be used by programmers as a repository for additional group data.

Overview of Participant Source File.

Each participant source file 600 is arranged using a format, which will now be described. Each participant source file 600 describes one participant. The first line in the participant source file 600 has a tag with a name of "participant" and no attributes and this tag also starts a participant section 605 of the participant source file 600. The layout of a participant source file is shown in Appendix B.

The participant section 605 contains one or more implementations 610, each specified using a tag having the name "implementation" with one attribute indicating "serverModel". The implementation contains a description of the participant for each condition under which the participant may be used, as specified using the value of the serverModel attribute. Although three implementations 610-612 are shown in the Figure, any number of at least one may be included. In one embodiment, a serverModel attribute has a value of either "ASP/JavaScript", "ASP/VBScript", "JSP", or "Cold Fusion", indicating the server side language to be used. In another embodiment, the attribute of the implementation tag is "state" with a value of the state for which a legal clause may be used.

Each implementation 610 may contain quick search 620. Quick search 620 is required for those implementations where the parent participant contains a "partType" attribute with a value of "identifier", and is specified using a tag having the name "quickSearch" and data containing a simple search string to be used to quickly scan a document for this participant.

Each implementation 610 may contain insert text 630, specified using a tag having the name "insertText" with attributes "location" and "nodeParamName". Insert text provides between insertText start and end tags text to be inserted in the document at a location specified by the "location" and "nodeParamName" attributes. The location may be specified (e.g. have a value of) as "aboveHTML", in which case the text is inserted before the <html> tag in the document. The location may be specified as "aboveHTML+weight", where "weight" is an integer between 1 and 99 and is used to resolve conflicts among multiple participants inserted above the <html> tag as described below. The location may be specified as "belowHTML", in which case the text is inserted after the </html> tag in the document. The location may be specified as "belowHTML+weight", where "weight" is an integer between 1 and 99 and is used to resolve conflicts among multiple participants inserted after the </html> tag as described below. The location may be specified as "beforeSelection" in which case the text is inserted before a current selection or insertion point, or at the end of the <body> tag if there is no selection. The location may be specified as "replaceSelection" in which case the text replaces the current selection, or inserts at the end of the <body> tag if there is no selection. The location may be specified as "wrapSelection" in which case the text is inserted before the current selection, and adds the appropriate close tag after the current selection. The location may be specified as "afterSelection", in which case the text is inserted after the current selection, or inserts at the end of the <body> tag if there is no current selection. The location may be specified as "beforeNode", in which case the nodeParamName attribute refers to the node from the Document Object Model (DOM) before which the text is to be inserted as described below. The location may be specified as "replaceNode", in which case the nodeParamName attribute refers to the node from the DOM that is to be replaced by the text. The location may be specified as "afterNode", in which case the nodeParamName attribute refers to the node from the DOM after which the text is to be inserted. The location may be specified as "firstChildOfNode", in which case the text is inserted as the first child of the block tag referred to in the nodeParamName attribute. The location may be specified as "lastChildOfNode", in which case the text is inserted as the last child of the block tag referred to by the nodeParamName attribute. The location may be specified as "nodeAttribute", in which case the text is inserted as an attribute of the node referred to by the nodeParamName attribute. The location may be specified as "nodeAttribute+attribute", which operates similarly to "nodeAttribute" except that "+attribute" specifies an attribute name to set with the insert text.

Although the DOM is used as an object model in one embodiment of the present invention, any similar object model describing identifiable locations of objects in the document may be used by the present invention wherever the DOM is used herein. Similarly, other locations may be used in place of the location of the HTML tag. For example, a signature block or address field of a letter may be used or a recitals section of a legal document may be used in place of the location of HTML code in other embodiments of the present invention.

Each implementation 610 may contain a search patterns section 640, specified using a tag having the name "searchPatterns" and a required attribute of the search location, specified as "whereToSearch". Search patterns 640 provides information on where to search within the document for the participant text. The search location may be specified as "directive", in which case all server directives are searched. The search location may be specified as "tag+tagName", which indicates that only the content of tags with a name of "tagName" should be searched. The search location may be specified as "tag+*", which indicates that the content of all tags should be searched. The search location may be specified as "comment", which indicates that only HTML comments should be searched. The search location may be specified as "text", which indicates that only raw text sections should be searched.

A search patterns section 640 may contain search pattern 642, specified using a tag having the name "searchPattern", and providing a pattern used to identify participant text and extract parameters from it. A participant source file contains at least one search pattern, although the Figure shows two search pattern 642-644. Search pattern 642 has a required attribute of the parameter names, specified as "paramNames", and optional attributes of the search limit, specified as "limitSearch" and an optional flag, specified as "is Optional". The parameter names contains a comma-separated list of parameter names whose values are being extracted. The search limit may be specified as "all", which does not limit the search, and is the default. The search limit may be specified as "attribute+attribName", which limits the search to attributes named "attribName" when the search location has been specified for search patterns 640. The search limit may be specified as "tagOnly", which only searches the outer tag and ignores the inner HTML. A search limit of "tagOnly" is valid when the whereToSearch attribute of the search patterns section 640 corresponds to a tag. The search limit may be specified as "innerOnly", which only searches the inner HTML and ignores the outer tag. A search limit of "innerOnly" is valid when the whereToSearch attribute of the search patterns section 640 corresponds to a tag. The optional flag may be specified as "true" or "false": when "true", the search pattern does not have to be found for the participant to be identified; when "false" the search pattern must be found for the participant to be identified.

Each implementation 610 may contain an update patterns section 650, specified using a tag having the name "updatePatterns", and providing a container to hold one or more update pattern 652, 654.

The update patterns section 650 contains at least one update pattern 652-654, which is specified by use of an "updatePattern" tag with a required parameter name attribute, and provides a regular expression used for precise updates of participant text. Each update pattern is used to update a parameter as described in more detail below. Update patterns 650 may have any number greater than one of update pattern, although the Figure shows two update pattern 652, 654. The parameter name attribute is specified as "paramName", and takes as its value the name of a single parameter whose value will be used to update the participant.

Each implementation 610 may contain delete 660, which provides control over what portion of a participant is deleted when an author uses system 200 to delete a participant. Delete 660 is specified by use of the "delete" tag with one optional attribute of delete type, specified as "deleteType". Delete type may be specified as "all", which indicates that the entire participant is to be deleted when the author so indicates. Delete type may be specified as "none", which prevents the participant from being deleted automatically. Delete type may be specified as "tagOnly", which deletes the outer tag and leaves the inner HTML (between a start and end tag) intact. Delete type may be specified as "innerOnly", which removes only the inner HTML. Delete type may be specified as "attribute+attribName", which removes only the specified attribute from a tag. Delete type may be specified as "attribute+*", which removes all attributes from a tag.

Each implementation 610 may contain translator 670, which provides information for how to translate a participant so that it is rendered differently on the screen, and possibly specify a custom property inspector as described below.

A translator 670 may contain search patterns 674, which is specified in a manner identical to that used to specify search patterns 640 except that search patterns 674 does not have a search location attribute.

As shown in FIG. 6B, translator 670 may contain a translations section 676, which provides a container for holding any translation 680-686 described.

A translations section 676 may contain a translation 680, specified as a tag having the name, "translation", which contains a single translation instruction. A translations 676 may contain any number of translation 680-686, although the Figure shows only four. Each translation 680-686 has a required attribute of search location, and optional attributes of search limit and translation type. The search location attribute is specified as "whereToSearch", and is specified identically to the "whereToSearch" attribute of search patterns 640. The search limit attribute is specified as "searchLimit", and is specified identically to the "searchLimit" attribute of search pattern 640-642. The translation type attribute is specified as "translationType"; translation type may take as a value "dynamic data", which indicates that these translated directives look and behave like Dreamweaver UltraDev dynamic data. Translation type may take as a value "dynamic image", which indicates that these translated attributes should look and behave like Dreamweaver UltraDev dynamic images. Translation type may take as a value "dynamic source", which indicates that these translated directives should look and behave like Dreamweaver UltraDev dynamic data sources. Translation type may take as a value "tabbed region start", which indicates that these translated <CFLOOP> tags define the beginning of a tabbed outline. Translation type may take as a value "tabbed region end", which indicates that these translated </CFLOOP> tags define the end of a tabbed outline. These are described in the help files of the conventional Dreamweaver product, available from Macromedia Incorporated of San Francisco, Calif. Translation type may take as a value "custom", which is the default case in which no functionality is added to the translation.

Each translation 680 may contain an open tag section 690, specified using a tag named, "openTag", which provides a tag name of an open tag that the dynamic data is translated to for rendering and should not include the "<" or ">".

Each translation 680 may contain an attributes section 691, specified using a tag named, "attributes", which provides a container for holding any attribute 693-694.

An attributes 691 contains one or more attribute 692-693, specified using a tag named, "attribute". Each attribute provides a single attribute or translated attribute to be added to the translated open tag. Any number of attribute may be specified, although the Figure shows only two. Attribute is specified by means of a name=value pair between an attribute start tag and an attribute end tag.

Each translation 680 may contain a display 696, specified using a tag named, "display", which provides an optional display string that should be inserted in the translation.

Each translation 680 may contain a close tag 698, specified using a tag named, "closeTag", which provides an optional tag that should be inserted at the end of the translated section, as an end tag and should match the value of open tag and not include the "</" or ">".

Begin Editing a Document

Once the editor has created one or more group source files 500 and one or more participant source files 600, the author can begin editing a document using system 200. Command manager 212 receives the file name and path of the file to be edited from operating system (not shown), and sends the file handle to document file reader 250A or 250B.

Each document file reader 250A or 250B receives the file name and path and signals operating system to open the document. Document file reader 250A or 250B reads the document and stores the document in document file storage 256.

In one embodiment, the document is stored via the operating system's file system in either a proprietary format or in a conventional format, such as unformatted ASCII or HTML, or in both formats. In such embodiment, document file reader 250A reads conventionally formatted version of the document and stores the document in document file storage 256, and file reader 250B reads proprietary formatted version of the document and stores the document in document file storage 256. In one embodiment, command manager 212 signals the document file reader 250A or 250B based upon the file extension of the file. In one embodiment, document file reader 250A is used without document file reader 250B and reads and stores the file as described in U.S. patent application Ser. No. 09/991,759 entitled, "SYSTEM AND METHOD FOR EDITING INFORMATION" filed Nov. 24, 2001 by Narciso Jaramillo, and that application is incorporated herein by reference in its entirety.

Once document file reader 250A or 250B has read and stored the document, document file reader 250A or 250B signals group source file reader 252 with the file name and path of the document.

Group source file reader 252 receives the document file name and path and locates all group source files 500 that are associated with the copending document. There can be any number of such group source files 500. In one embodiment, all associated group source files 500 are stored in the same path on disk as the document. In one embodiment, the editor has created a configuration file with a particular name in a particular location on disk, and this configuration file contains the names and paths of all associated group source files 500. In such embodiment, group source file reader 252 reads this file and uses it to locate the group source files.

For each located group source file 500, group source file reader 252 signals operating system to open the file. Group source file reader 252 reads the file and stores it in group source file storage 258. After all group source files are read and stored, group source file reader 252 signals group source file parser 264.

Group source file parser 264 scans group source file storage 258, locates each behavior, and sends an identifier of each behavior to command manager 212. In one embodiment, group source file parser 264 uses title 520 of each behavior as the identifier. For each group source file stored in group source file storage 258, group source file parser 264 sends the identifier and the location in group source file storage 258 of the group source file 500 to command manager 212.

Command manager 212 receives the identifiers and group source file storage locations from group source file parser 264. Command manager 212 stores each identifier and the storage location of its associated group source file as two elements in a list item, and stores all such list items in local storage within command manager 212. Command manager 212 signals document editor 230 to display the document stored in document file storage 256 and allow editing of the document.

Document editor 230 receives the signal. Document editor 230 consists of either graphical document editor 232, textual document editor 234, or both. In one embodiment, document editor 230 consists of both graphical document editor 232 and textual document editor 234, and command manager 212 launches each in their own window or pane on the display. In one embodiment, the author can independently display or hide graphical document editor 232 or textual document editor 234.

In such embodiment, as the author works on a document graphical document editor 232 formats and displays the document in its pane according to commands such as HTML tags contained in the document, while textual document editor 234 displays the document unformatted. For example, when the author is working on an HTML document, graphical document editor 232 displays the document in its pane as would a conventional browser, and textual document editor 234 displays the HTML source code in its pane. In this example, the author may change the HTML document either by working graphically in the graphical document editor 232 pane, or by editing the HTML source code in the textual document editor 234 pane as described in the copending application.

Add a Participants from a Behavior

When the author wishes to add a behavior to the document, the author requests the menu of behaviors available for addition from command manager 212. Command manager 212 receives the request, retrieves the list of behavior identifiers from local storage, and formats and displays the list of behavior identifiers as menu items in a menu of behaviors. The author selects the identifier of a desired behavior, and the behavior identifier is received by command manager 212.

Command manager 212 scans local storage for the item containing the received behavior identifier, and extracts the location of the group source file from the item. Command manager 212 sends the location of the group source file to group source file parser 264, and sends the document file handle to behavior manager 216.

Behavior manager 216 locates the behavior interface file for the received behavior identifier. The behavior interface file was created by the editor in the process of writing the behavior, and contains specifications for the number and type of any parameters that can or must be processed by this behavior as well as user interface data describing how to prompt the author for those parameters. In addition, the behavior interface file contains general rules about the use of the behavior, such as limits on how many such behaviors may be inserted in any one document. In one embodiment, the behavior interface file is an HTML file containing at least one <form> tag, a JavaScript program, or both. In one embodiment, the behavior interface file is a VisualBasic script.

For example, if the editor were writing a behavior to insert a list of recitals into a legal document, the behavior interface file would define the plaintiff's name as a parameter that the behavior could insert in the correct place. This parameter would have a name of "plaintiff". In this case, the behavior interface file would also contain a description "plaintiff" as a character string containing no numbers, and a definition of a text box labeled "Plaintiff" that when displayed, allows the author to enter or change the value of the character string.

In another example, the editor has written a behavior to add "footer" information to the bottom of a web page. This information includes a corporate logo, copyright information, and links to a privacy policy and contact information. In this case, the author has no control over what is added to the web page (because it is the same in every case), or the location of the insertion (because it is always the last thing on the page). So, no parameters are required or accepted for this behavior.

In one embodiment, behavior manager 216 locates the behavior interface file by generating a file identifier consisting of the filename of the group source file and an extension of "HTML". In another embodiment, the document is stored in a proprietary format and the behavior interface file identifier is stored within the document and located by document object model locator 222.

Once behavior manager 216 has located the behavior interface file, behavior manager 216 reads the behavior interface file and uses the user interface information within to display an interface on the screen. This interface may contain text boxes, drop-down lists, radio buttons, or other conventional user interface objects that allow the author to specify values for any of the parameters that the behavior can process. The interface also contains at least one "submit" or "OK" button.

The author uses the interface to specify values for any behavior parameters, and clicks the "submit" button. In addition, the editor may have designed the behavior in such a way that the insertion point of the behavior within the document can be chosen by the author or that the behavior operates with respect to a selection of displayed objects in the graphical document editor 232 or displayed text in textual document editor 234. In such a case, the author uses document editor 230 to select an insertion point or make a selection within the document using conventional methods, such as click-and-drag to highlight a section of text, to indicate the insertion point or the selection. The author selects the insertion point or makes a selection before clicking on the "submit" button and may select the insertion point before requesting the menu of behaviors from command manager 212 as described above. Behavior manager 216 receives the names and values for all specified parameters and sends the names, values, and the location of the behavior interface file to behavior validity manager 272. Document editor 230 also sends an indication of any insertion point or selected objects or text (such as is described in the copending application) to behavior validity manager 272.

In one embodiment, behavior validity manager 272 checks the validity of all behavior parameters received from the author. In one embodiment, behavior validity manager 272 is provided by the editor and contains source code to check the validity of the parameters. Behavior validity manager 272 receives the location of the behavior interface file, the name/value pairs, and optionally the document selection. Behavior validity manager 272 reads the behavior interface file and locates the parameter type definitions within the behavior interface file. Behavior validity manager 272 uses the parameter type definitions to check each received parameter value to ensure each of the parameters received are of a type matching the definition for that parameter, and marks each received parameter as either "valid" or "invalid". For example, if the behavior interface file indicates that a particular parameter is required and behavior validity manager 272 does not find that parameter, or a parameter defined as "numeric" contains non-numeric characters, behavior validity manager 272 flags that parameter as "invalid".

In one embodiment, behavior validity manager 272 checks the document selection, if provided, for validity per the definitions in behavior interface file. If, for example, the editor had designed a behavior that was valid for a selection only within a table of contents and the author provided a selection in the body of the document, behavior validity manager 272 would flag the selection as "invalid".

In one embodiment, behavior validity manager 272 also checks the behavior environment. The editor can place limitations on a behavior such as the number of instances of a behavior that can exist in one document. In the above web page footer example, the editor can add a requirement that this behavior should be used to add no more than one footer to a page, so behavior validity manager 272 makes this check as described below and flags the entire behavior as "invalid" if there already exists an instance of this behavior on the web page.

If behavior validity manager 272 determines that all parameters, document selections, and environmental conditions are valid, then behavior validity manager 272 sends the parameter name/value pairs to parameter substitutor 270 and the document selection, if any, to insertion point identifier 280. For each parameter or environmental condition that behavior validity manager 272 finds invalid, behavior validity manager 272 sends an indication of the error to the author via operating system 210 and input/output 208. In the above example, behavior validity manager 272 would send "Required parameter 'name' not specified" or "Year not numeric". In one embodiment, behavior validity manager 272 sends one generic error indication if behavior validity manager 272 finds any parameters or environmental conditions to be invalid.

Once command manager 212 has sent the group source file 500 location to group source file parser 264, group source file parser 264 receives the group source file 500 location and parses group source file 500 to find group participants 530, which is the list of all participants of this behavior. In one embodiment, each group participant 540-544 entry in the group source file contains the file name and path of a participant source file. In such embodiment, group source file parser 264 sends the file name and path of each group participant 540-544 to participant source file reader 254.

Participant source file reader 254 receives the list of participant source file names and paths, and reads each participant source file 600 in turn, storing each in participant source file storage 260. Participant source file reader 254 signals participant source file parser 266.

Participant source file parser 266 examines participant source file storage 260 and parses each participant source file 600, extracting insert text 630 which consists of two fields: the text or other object to be inserted, herein referred to as the participant object, and the location within the document where the participant is to be inserted, consisting of the values of the "location" and "nodeParamName" attributes of the "insertText" tag, referred to herein as the "participant location".

Participant source file parser 266 sends the participant object to parameter locator 268 and the participant location to insertion point identifier 280.

Parameter locator 268 receives the participant object and identifies the locations of any parameters within the participant object. If the participant object is a block of text, it may contain placeholders to indicate the location of a parameter within the block of text for example, by placing the parameter name between delimiters such as "@@". In one embodiment, to indicate the location within the participant object where the value of a parameter named "zot" is to be inserted, the editor writes "@@zot@@". Parameter locator 268 scans the participant object and finds all such occurrences of parameter names. For each such parameter name that parameter locator 268 finds, parameter locator 268 sends the parameter name, the character offset from the beginning of the participant object and the character length of the parameter name (which may include the delimiter characters) to parameter substitutor 270. Parameter locator 268 also sends the participant object to parameter substitutor 270.

Parameter substitutor 270 uses the list of name/value pairs to substitute the parameter values for the parameter names in the participant object. Parameter substitutor 270 receives the list of parameter names, offsets and lengths, and the participant object from parameter locator 268, and the parameter name/value pairs from behavior validity manager 272.

Parameter substitutor 270 sorts the name-offset-length list by offset in descending order, so that the first entry in the name-offset-length list is the last substitution in the participant object. Parameter substitutor 270 selects the first entry in the sorted name-offset-length list, locates the same parameter name in the name/value pair list and selects the associated value. Parameter substitutor 270 uses the offset and length from the selected entry to replace the substitution indicator with the selected value in the participant object. Parameter substitutor 270 selects the next entry in the sorted name-offset-length list and repeats the above procedure until all substitution indicators in the participant object have been substituted with their corresponding values. Once parameter substitutor 270 has substituted parameter values for the substitution indicators, parameter substitutor 270 sends the participant object containing the substituted values to inserter 274.

Once participant source file parser 266 has sent the participant locations to insertion point identifier 280 and behavior validity manager 272 has sent the author's document selection to insertion point identifier 280 as described above, insertion point identifier 280 forwards them to region identifier 220.

The participant location is a description or part of a description, provided by the editor, of the location within a document where the participant is to be inserted. In one embodiment, documents contain markup tags and the participant location refers to a region of the document delineated by certain tags. In such embodiment, the participant location can instruct system 200 to insert a participant before a particular tag, after a particular tag, or to replace a particular tag. The participant location can instead indicate to system 200 to insert a participant as a child of a particular tag, either as the first child or the last child. In one embodiment, the participant location can indicate to system 200 to insert the participant as the attribute of a markup tag.

In the case where the author provided a document selection, the participant location can indicate to system 200 to insert a participant before such a document selection, after such a document selection, to replace the document selection, or to wrap the participant around the document selection by treating the participant object as if it contained markup tags: inserting the participant object before the document selection and generating a matching "close" tag to insert after the document selection.

The participant location can optionally include a weight, which in one embodiment is a number between zero and one hundred. In the event that the author attempts to insert two participants in the same participant location, the participant having a participant location with the lower weight is inserted before the participant with a participant location with the higher weight. In one embodiment, if the editor does not assign a weight to a participant location, the weight defaults to one hundred, although other embodiments have other defaults.

Region identifier 220 receives each participant location and, if provided, document selection. Region identifier 220 examines each participant location and determines if the participant location refers to a predetermined location or a document selection. If the participant location refers to a predetermined location, then region identifier 220 sends the participant location to document object model locator 222; if the participant location refers to a document selection, then region identifier 220 sends the participant location and the document selection to selection locator 224.

Examples of a participant location referring to a predetermined location is "immediately following the signature block", or "inside the <body> tag". An example of a participant location referring to a document selection is "replace the selection with this text".

Document object model locator 222 receives the participant location and parses the document in document file storage 256 to locate the character position of, and number of characters in, the predetermined location within the document such as an element of the document object model in an HTML document. Document object model locator 222 stores the character position of the predetermined location, the length of the predetermined location, and the participant location in region storage 228.

Selection locator 224 receives the participant location that refers to a document selection and the document selection, and scans the document in document file storage 256 for the document selection. Selection locator 224 stores the character position of the document selection, the length of the document selection, and the participant location in region storage 228.

Once insertion point identifier 280 has sent each received participant location to region identifier 220 as described above, insertion point identifier 280 determines, for each received participant location, if the participant location conflicts with any other participants already inserted in the document. If insertion point identifier 280 finds any such conflicts, insertion point identifier 280 uses participant location weights to resolve the conflicts as described below.

To identify any conflicts with participants already in the document at the participant location, insertion point identifier 280 causes group source file parser 264, and participant source file reader 254 to signal participant source file parser 266 as described above. Participant source file parser 266 parses each participant in turn, extracting the participant location from insert text 630, and extracting quick search 620. For each participant, participant source file parser 266 creates an element consisting of the participant location, quick search string, and the storage location of participant source file 600 in participant source file storage 260, and sends this element to insertion point identifier 280.

The quick search string is a character string provided by the editor that is unique to each participant. The purpose of the quick search string is to provide a fast method of checking to see if a particular document contains at least one instance of a particular participant.

Insertion point identifier 280 receives the elements from participant source file parser 266. For each received element, insertion point identifier 280 extracts the participant location and compares it to the original participant location (the one from the participant being inserted). Insertion point identifier 280 discards elements whose participant location does not match the original participant location.

For each element not discarded, insertion point identifier 280 extracts the quick search string from the element and sends the quick search string to search text locator 226. Search text locator 226 receives the quick search string and scans the document in document file storage 256 for the received string. If search text locator 226 finds the string in the document, search text locator 226 returns a "found" signal to insertion point identifier 280; if search text locator 226 does not find the string in the document, search text locator 226 returns a "not found" signal to insertion point identifier 280.

In one embodiment, the editor can use the null string as a quick search string. In such embodiment, search text locator 226 sends a "found" signal in every case.

Insertion point identifier 280 receives the signal from search text locator 226 and examines the signal. If it is a "not found" signal, insertion point identifier 280 discards the element from which insertion point identifier 280 had extracted the quick search string. If it is a "found" signal, insertion point identifier 280 has found a potential conflict and resolves this conflict as will now be described.

Insertion point identifier 280 extracts the storage location of participant source file 600 of the conflicting participant from the received element, and sends the conflicting participant storage location to participant source file parser 266. Participant source file parser 266 receives the conflicting participant storage location, parses the associated participant source file 600, extracts search pattern 642 and the search location, extracts insert text 630 and extracts participant location from participant source file 600. Participant source file parser 226 sends the search pattern to search text locator 226 and the search location to document object model locator 222. Participant source file parser 266 stores the participant location in region storage 228.

The search pattern is a specification used to locate a participant and its parameters within the document. It is similar to a quick search string, but is able to locate and parse more complicated patterns within the document. For example, the editor has written a behavior with the following participant:

"Please click the @@button_type@@ button for help."

The author has inserted this behavior into the document, and in doing so, set the @@button_type@@ parameter to "red"; the document would then contain:

"Please click the red button for help."

A search pattern can identify this as a participant in spite of the fact that @@button_type@@ could have virtually any adjective substituted for it.

Search patterns also contain a specification of where to search within the document, herein called the search location, and optionally a list of the parameters referenced by the search pattern, herein called the search parameters.

In one embodiment, search patterns are conventional Unix regular expressions. In one embodiment, search patterns are fragments of conventional Perl scripts that when executed return a non-zero character position and length if the match is successful.

Document object model locator 222 receives the search location, parses the document in document file storage 256, and finds the character position and length of the search location. Document object model locator 222 sends the character position and length to search text locator 226.

Search text locator 226 receives the character position and length and the search pattern, and uses the search pattern to scan the fragment of the document in document file storage 256 indicated by the character position and length. When search text locator 226 finds the participant, search text locator 226 stores the character position and length of the participant within document file storage 256 in region storage 228 associated with the participant location stored by participant source file parser 266.

In one embodiment, a participant may have more than one search pattern. In such embodiment, search text locator 226 uses each search pattern in turn, and recognizes a match only if all participant search patterns match.

Once search text locator 226 and participant source file parser 266 have stored the character position, length, and participant location of all conflicting participants in region storage 228, insertion point identifier 280 resolves the conflicts by using the participant weight. To do this, insertion point identifier 280 sorts the entries in region storage 228 by the weight of the participant location. Insertion point identifier 280 examines the weight of each entry in region storage 228 in turn, comparing it to the weight of the original participant location. If insertion point identifier 280 finds an entry in region storage 228 whose weight is greater than or equal to the weight of the original participant location, insertion point identifier 280 computes the insertion point of the original participant object as the character position one less than the character position of the entry. If insertion point identifier 280 finds no entries whose weight is greater than or equal to the weight of the original participant location, insertion point identifier 280 computes the insertion point of the original participant object as the character position equal to the character position of the last entry in region storage 228 plus the length of that entry.

Insertion point identifier 280 sends the computed insertion point to inserter 274, examines the original participant location, and sends inserter 274 a flag indicating either "before", "after", or "replace" depending on the participant location.

Inserter 274 receives the participant object from parameter substitutor 270, and the computed insertion point and the before/after/replace flag from insertion point identifier 280. Inserter 274 retrieves the length of the predetermined location or document selection from region storage 228, and updates the document in document file storage 256 by inserting the participant object into the document either before or after the computed insertion point, or by replacing the section of the document starting at the computed insertion point for the retrieved length with the participant object, depending on the value of the flag. Once inserter 274 has inserted the participant object into the document at the proper location, inserter 274 signals command manager 212.

Delete a Behavior

The author may wish to delete any behavior either existing or inserted into the document behavior. To delete a behavior, the author requests the menu of behaviors available for deletion from command manager 212. Command manager 212 receives the request, formats and displays the list of behavior identifiers as described above, and allows the author to request the deletion of the desired behavior in a manner similar to the addition of a behavior as described above.

In one embodiment, command manager 212 initiates the identification of behaviors that exist in the document as described below, marks a behavior identifier once it has been inserted, and unmarks it when deleted. In such embodiment, command manager 212 displays only those behaviors that exist in the document when the author indicates a desire to delete a behavior.

Once the author has selected a behavior, command manager 212 receives the behavior identifier, scans local storage for the item containing the received behavior identifier, and extracts the group source file 500 location from the item as described above.

Command manager 212 sends the group source file 500 location to group source file parser 264 which locates group participants 530 as described above; group source file parser 264 sends participant source file reader 254 group participant 540-544 as described above. Participant source file reader 254 signals participant source file parser 266 as described above. For each participant source file 600, participant source file parser 266 locates and extracts quick search 620 as described above, and returns the quick search string to command manager 212. Command manager 212 receives each of the quick search strings and sends each of the quick search strings to search text locator 226.

Search text locator 226 uses each of the quick search strings to determine if the document may contain the indicated participants as described above. If search text locator 226 returns a "not found" signal to command manager 212, then command manager 212 sends an error indication to the author as described above. In one embodiment described above, the editor can flag a participant as optional. In such embodiment, command manager 212 ignores the case where search text locator 226 returns a "not found".

If command manager 212 receives a "found" signal from search text locator 226 for each of the sent quick search strings, command manager 212 sends the storage location of group source file 500 for the selected behavior to group source file parser 264. Group source file parser 264 signals participant source file parser 266 as described above, and sends the storage location of group source file 500 for the selected behavior to participant checker 282.

One or more of the participants that the author is deleting may have been inserted by more than one different behaviors. Participant checker 282 checks for this condition so that system 200 does not delete participants that are in use by other behaviors, as will now be described.

Participant checker 282 receives the storage location of group source file 500 for the selected behavior, and signals group source file parser 264 to extract group participants 530, and to extract each group participant 540-544, from group source file 500 for the selected behavior. These extracted group participants are referred to herein as the received participants, the group referred to by group source file 500 for the selected behavior is referred to herein as the received group, and group source file 500 for the selected behavior is referred to as the received group source file.

Participant checker 282 selects the first group in group source file storage 258. If the selected group is the same as the received group, participant checker 282 discards the selection. If the selected group is different from the received group, participant checker 282 signals group source file parser 264 to locate all group participant 540-544 for the selected group as described above; group source file parser 264 signals participant source file parser 266 as described above. For each participant of the selected group, herein called the selected participants, participant source file parser 266 extracts quick search 620 and each search pattern 642-644 and sends the quick search string, search location, and each search pattern to participant checker 282.

For each non-optional participant of the selected group, participant checker 282 receives the quick search string, search location, and search patterns. Participant checker 282 sends the quick search string to search text locator 226, which returns "found" or "not found" as described above. If search text locator 226 returns "not found", participant checker 282 discards the selected group. If search text locator 226 returns "found", participant checker 282 sends the search pattern and the search location to search text locator 226, which searches the document in document file storage 256 for the search pattern as described above. If search text locator 226 returns "not found", participant checker 282 discards the selected group.

If search text locator 226 returns "found", participant checker 282 compares group participant 540-544 of the selected participant to group participant 540-544 of each received participant. For each match that participant checker 282 finds, participant checker 282 sends an indication of the matching group participant to command manager 212.

Participant checker 282 selects the next group in group source file storage 258, and continues with the above procedure until participant checker 282 has compared all participants of all behaviors found in the document in document file storage 256 to the received participants.

As participant checker 282 sends to command manager 212 an indication of a matching group participant 540-544 for each received participant that participant checker 282 has determined is also part of another installed behavior, command manager 212 builds a list of matching group participants. The list contains group participants that, although a selected participant, is in use by another behavior and therefore should not be deleted in order to delete the selected behavior.

For each participant to be deleted, command manager 212 signals document object model locator 222 and/or search text locator 226 to find the participant in the source file, and then signals deleter 276, as will now be described.

For each selected participant that is not in the list of matching group participants 540-544, command manager 212 signals participant source file parser 266 to locate and extract search patterns 640 and quick search 620. Participant source file parser 266 sends each search location to document object model locator 222, and the search patterns and quick search string to search text locator 226.

Document object model locator 222 computes the character position and length of the search location as described above, and sends the character position and length to search text locator 226. Search text locator 226 receives the character position and length, the search patterns, and the quick search string, and scans the indicated fragment of the document in document file storage 256 for the search pattern. If search text locator 226 finds a match for the search pattern, search text locator 226 sends the character position and length of the search pattern match to deleter 276. If search text locator 226 found a match for the search pattern, search text locator 226 signals command manager 212 with a "found", otherwise search text locator 226 signals command manager 212 with a "not found".

If, for the received group, command manager 212 determines that not all participants are found, then command manager 212 returns an error indication to the author, unless the participant was marked as being optional by the editor as described above.

Deleter 276 receives a search pattern character position and length for each participant that search text locator 226 finds. For each search pattern character position and length that deleter 276 receives, deleter 276 deletes the section indicated by the search pattern character position and length from the document in document file storage 256.

In one embodiment, the editor can place limits on how or whether a behavior can be deleted. In such embodiment, participant source file 600 contains delete 660, which is an element that participant source file parser 266 extracts and sends to behavior validity manager 272. Behavior validity manager 272 receives and examines the delete element. If the delete element indicates "delete all", then the operation of deleter 276 is as described above. In one embodiment, the default value of delete 660 is "delete all". If the delete element indicates "delete none", then the editor does not allow the author to delete this behavior, and behavior validity manager 272 returns an error indication to the author as described above.

If the delete element indicates "delete tag only", then for participants that consist of HTML tags, only the outer HTML tag is removed from the participant, leaving any inner HTML intact. If the delete element indicates "delete inner only", then for participants that consist of HTML tags, only the inner HTML is removed from the participant, leaving the outer tags intact, or for participants that consist of HTML attributes, removes the values of the attributes. If the delete element indicates "delete attribute attribName", then for participants that consist of HTML tags, just the attribute "attribName" is removed from the participant. If the delete element indicates "delete attribute *", then for participants that consist of HTML tags all attributes are removed.

Modify a Behavior

An author may wish to change any behavior existing in the document. To change the behavior, the author requests a menu of behaviors available for modification from command manager 212. Command manager 212 receives the signal, formats and displays the list of behavior identifiers, and allows the author to select the desired behavior as described above.

In one embodiment, command manager 212 identifies which behaviors exist in the document as described above, marks a behavior identifier once it has been inserted into the document, and unmarks it when deleted. In such embodiment, command manager 212 displays only those behaviors that exist in the document when the author indicates a desire to modify a behavior.

Once the author has selected a behavior, command manager 212 receives the behavior identifier, scans local storage for the item containing the received behavior identifier, and extracts the group source file 500 location from the item as described above.

In one embodiment, when an author requests modification of a behavior, command manager 212 first deletes the behavior as described above. If the delete process encounters any errors, system 200 sends an indication of the error to the author as described above; if no errors are encountered then system 200 signals command manager 212 to add the behavior as described above.

In one embodiment, the editor can more precisely control how a behavior can be modified, so that the behavior is updated rather than being deleted and re-inserted. In such embodiment, participant source file 600 contains update patterns 650, consisting of update pattern 652-654.

Update patterns are similar to search patterns. An update pattern differs from a search pattern in that the editor designs a search pattern to detect if a participant is installed, and so the editor uses for a search pattern as much of the inserted text as is practicable in order to avoid the case where the search pattern is ambiguous and matches text that is not part of a participant. In contrast to search patterns, the editor designs an update pattern to match that part of the participant that contains parameters. In one embodiment, the editor provides one update pattern for each parameter in a participant. This allows the author to modify non-critical portions of a participant, while still being able to use the modify function of system 200 to change behavior parameters.

In such embodiment, once command manager 212 has extracted the group source file 500 location as described above, command manager 212 causes search text locator 226 to scan the document for the quick search strings of each participant of the behavior, as described above.

If search text locator 226 locates the quick search strings of all participants, command manager 212 causes participant source file parser 266 to extract the search location and the search patterns for each participant as described above. For each participant, participant source file parser 266 sends each search location to document object model locator 222, and each search pattern to search text locator 226.

Document object model locator 222 computes the character position and length of the search location as described above, and sends the character position and length to search text locator 226, as described above. Search text locator 226 receives the character position and length and the search patterns and scans the indicated fragment of the document in document file storage 256, as described above. Search text locator 226 sends either a "found" or a "not found" signal to command manager 212, as described above.

Command manager 212 receives the signal and examines it. If, for the selected behavior, command manager 212 determines that not all participants are found, then command manager 212 returns an error indication to the author unless the participant was marked as optional by the editor as described above.

If the signal is "found", command manager 212 signals participant source file parser 266 as described above; participant source file parser 266 locates and extracts update pattern 652-654, and locates and extracts participant location and participant object as described above. Participant source file parser 266 sends the update pattern and participant object to parameter locator 268 and sends the participant location to document object model locator 222. Document object model locator 222 sends the character position and length of the participant location to parameter locator 268 as described above.

Parameter locator 268 receives the update patterns, participant object, and the character position and length of the participant location within the document. Parameter locator 268 scans the indicated portion of the document in document file storage 256, and using the update patterns, finds the substituted parameter values. Parameter locator 268 also scans the participant object in the same manner, and using the update patterns finds the parameter substitution indicator.

Using the above example, parameter locator 268 using an update pattern is able to recognize that, in the string:

"Please click the red button for help."

that "red" is a parameter that has been substituted for. Parameter locator 268 extracts the values that have been substituted for any parameters, "red" in the above example. Parameter locator 268 scans the participant object in the same manner, extracts the parameter name, and constructs a pair of the parameter name and value. In one embodiment, using the above example, parameter locator 268 constructs "button_type=red". Parameter locator 268 sends all such name/value pairs that it computes to behavior manager 216. Parameter locator 268 sends the update pattern and character position and length of the participant location to modifier 278.

Behavior manager 216 locates and reads the behavior interface file as described above, receives the name/value pairs, and matches the parameter names in the behavior interface file to the names of the received name/value pairs. Behavior manager 216 displays the interface as described above, but displays the received values instead of any default values that are in the behavior interface file. The author uses the interface to change the value for any or all behavior parameters and clicks the "submit" button, as described above.

Behavior manager 216 receives the names and original or changed values for all parameters. Behavior manager 216 examines the received values, selects those that were changed by the author, and constructs a list of triplets consisting of the parameter name, the old value, and the "new" value submitted by the author. Behavior manager 216 sends this list of triplets and the location of the behavior interface file to behavior validity manager 272.

Behavior validity manager 272 receives the location of the behavior interface file and the triplets, and checks each new value for validity as described above. If behavior validity manager 272 determines that all parameters are valid, then behavior validity manager 272 sends the parameter name/old value/new value triplets to modifier 278.

Modifier 278 receives the name/old value/new value triplets from behavior validity manager 272 and the update pattern and character position and length of the participant location from parameter locator 268. Modifier 278 operates on the document in document file storage 256, using the update pattern limited in range by the character position and length of the participant locator, and deletes the old values of the parameters in the document and inserts the new values in place of the corresponding deleted old values of the parameters for all triplets in which the new value is different from the old value.

A Refinement

It can be noted from the above description that a behavior may have more than one participant, and that the editor can create a behavior that may be inserted more than once in a document. In addition, the same participant may be inserted by more than one instance of a behavior. When the author requests that a document be changed using system 200 by adding, deleting, or modifying a behavior, system 200 matches participants with behaviors. There are a number of ways to match participants with behaviors; one embodiment will now be described.

Command manager 212 receives the add, delete, or modify command and the behavior identifier from the author as described above. Command manager 212 retrieves the storage locations of all group source files 500 from local storage, and causes group source file parser 264 and participant source file reader 254 to locate and store all participant source files 600 in participant source file storage 260, as described above. Participant source file reader 254 sends the storage location of each participant source file 600 in participant source file storage 260 to command manager 212; command manager 212 receives and stores the participant source file 600 locations in local storage in the item along with the behavior identifier and the storage location of group source file 500. This local storage list is herein referred to as the behavior list.

Command manager 212 marks the items of the behavior list that represent behaviors that exist in the document. To identify the items to mark, command manager 212 selects the first item in the behavior list, and selects the first participant source file location in the selected item. Command manager 212 signals participant source file parser 266 and search text locator 226 as described above to use the quick search string to determine if the selected participant exists in the document in document file storage 256. If the selected participant has not been added to the document, command manager 212 selects the next item in the behavior list and continues as above. If the selected participant has been added to the document, command manager 212 selects the next participant source file location in the selected item and continues as above. If command manager 212 determines that all non-optional participants within the selected item have been added to the document, command manager 212 marks the item as having been added to the document, selects the next item in the behavior list, and continues as described above until command manager 212 has found and marked all behaviors that exist in the document in document storage 256.

Once command manager 212 has determined which behaviors exist in the document, command manager 212 locates all of the participants of each such behavior. To locate all of the participants of each such behavior, command manager 212 scans the behavior list, and for each marked item extracts the list of participant source file locations. Command manager 212 combines all such extracted participant source file locations into another list, herein referred to as the participant list. Command manager 212 removes any duplicate participant source file locations from the participant list, and stores the participant list in local storage within command manager 212.

Command manager 212 searches the document for each participant in the participant list by selecting the first element of the participant list and signaling participant source file parser 266, which signals document object model locator 222 and search text locator 226 to locate the participant within the document as described above. For each instance of the participant in the document, command manager 212 receives the character position and length of the participant within the document, and stores the character position and length in the selected element.

In the case where command manager 212 receives more than one character position and length for a particular participant (as when multiple instances of a behavior exist in the document), for each instance after the first, command manager 212 forms a new element consisting of the participant source file 600 location and the second character position and length, marks it as a duplicate element, and stores this new element in the participant list.

Command manager 212 selects the next element not marked as a duplicate element from the participant list and continues as above until all instances of all participants have been located, and command manager 212 has saved the character positions and lengths of all instances of all participants in the participant list.

Once command manager 212 has located all instances of all participants that have been added to the document, command manager 212 identifies any parameters and their values that are within the added participants. To identify parameter and their values, command manager 212 selects the first element in the participant list, extracts the participant source file 600 location from the element, and sends the participant source file 600 location to participant source file parser 266, which extracts and returns insert text 630 as described above. Command manager 212 receives the insert text, extracts the character position and length from the selected element in the participant list, and sends the character position and length and the insert text to parameter locator 268.

Parameter locator 268 receives the character position, length, and the insert text. Parameter locator 268 scans the insert text and locates any parameters, and scans the indicated portion of the document and locates any parameter values as described above. Parameter locator 268 sends the parameter/value pairs to command manager 212. Command manager 212 receives the parameter/value pairs and stores them in the selected element, selects the next element in the participant list and proceeds as described above until parameter locator 268 has located all parameter/value pairs in all participants.

Once command manager 212 has received and stored all parameter/value pairs in the participant list, command manager 212 scans the parameter/value pairs in the participant list and identifies participants containing parameters that have the same name and the same value. Once command manager 212 has identified a set of participants that contain parameters with the same name and the same value, command manager 212 matches this set against the marked items of the behavior list to identify the behavior that the set of participants belong to. Command manager 212 stores the behavior identifier from the located item of the behavior list in each element of the sorted participant list that command manager 212 has determined belongs to the selected behavior. Participant elements than have such behavior identifiers stored in them are herein referred to as assigned participants.

Command manager 212 has not yet determined which behaviors the unassigned participants in the participant list belong to. To assign unassigned elements of the participant list to behaviors, command manager 212 sorts the participant list by the character position field of each element. Command manager 212 selects the unassigned element in the sorted participant list with the lowest character position, and scans the behavior list, selecting those items of the behavior list that refer to the selected element. For example, command manager 212 selects participant A, which is the first participant in the sorted participant list. Command manger 212 scans the behavior list, and selects the item containing group 1, which contains participants A and B, and the item containing group 2, which contains participants A and C.

Command manager 212 selects the next lowest unassigned element in the sorted participant list, scans the selected behavior list items for the selected element, and selects it. In the above example, the next lowest unassigned participant element is participant C, so command manager 212 selects the item containing group 2. Command manager 212 continues in this manner until command manager 212 finds every participant in a group, and stores the behavior identifier from the selected item of the behavior list in each element of the sorted participant list that command manager 212 has determined belongs to the selected behavior.

If command manager 212 does not find the selected participant in any selected item of the behavior list (in the above example, the next lowest unassigned participant is participant D), then command manager 212 un-selects all currently selected elements in the participant list and items in the behavior list, marks the lowest unassigned element of the participant list as an orphan, selects the lowest unassigned element of the participant list that is not marked as an orphan, and proceeds as described above until all participant elements are either assigned to a behavior or marked as an orphan.

Once command manager 212 has, for each participant element in the participant list, either matched that participant to a behavior in the behavior list, or marked that participant element as an orphan, command manager 212 stores the participant list and behavior list in local storage within command manager 212. When the author attempts to add a behavior that already exists in the document, command manager 212 signals behavior validity manager 272 to check as described above whether or not this behavior may exist multiple times within the document. When the author attempts to delete a behavior that command manager 212 detects has more than one instance in the document, command manager 212 prompts the user with a list of the instances detected, receives the author's selection, and signals deleter 276 to delete the selected behavior as described above. When the author attempts to modify a behavior that command manager 212 detects has more than one instance in the document, command manager 212 prompts the user with a list of the instances detected, receives the author's selection, and signals modifier 278 to delete the selected behavior as described above.

Multiple Implementations

In one embodiment, a participant can contain more than one implementation. In such embodiment, participant source file 600 contains one or more of implementation 610-614, which each in turn contain quick search 620, insert text 630, and other elements as shown on FIG. 6.

For example, if the editor were designing behaviors for drafting a contract, the editor may provide two implementations: one for a contract valid in the state of California, and one for a contract valid in the state of Virginia. In another example, if the editor were writing behaviors to be inserted on a web page, the editor may provide implementations valid for an ASP server side coding language, and for a Cold Fusion server side coding language.

In such embodiment, when the author adds, deletes, or modifies a behavior, command manager 212 signals environment manager 214, which examines local storage looking for a server model. If environment manager 214 does not find a server model, environment manager 214 signals participant source file parser 260. Participant source file parser 260 receives the signal, and as participant source file parser 260 parses participant source file 600, participant source file parser 260 extracts the server model from each implementation and signals environment manager 214 with the list of server models. Environment manager 214 receives the list or server models, and if there is more than one server model in the list, environment manager 214 sends the list of server models to command manager 212, which prompts the author for the server model that the author wishes to use. Command manager 212 receives the author's selected server model and sends the selected server model to environment manager 214. If there is only one item in the received server model list, environment manager 214 selects the one server model. Environment manager 214 stores the selected server model in local storage within environment manager 214, and sends the selected server model to participant source file parser 260 which receives the server model and chooses the implementation that matches the server model, and proceeds as described above.

If, when environment manager 214 scans local storage, environment manager 214 locates a server model, environment manager 214 selects the server model and sends the server model to participant source file parser 260, which uses the selected server model as described above.

Translator

In one embodiment, participant source file 600 may contain translator 670. In such embodiment, translator 670 contains search patterns 674 and translations 676; translations 676 in turn contains translation 680-686. The editor may add one or more translation to a participant to control how graphical document editor 232 displays the participant once the author has added the participant to the document, and optionally to provide a unique property inspector for each translation.

For example, the editor has created a participant that adds a signature block to a memo. As part of the participant, the editor has created a translation for the signature that refers to a GIF format image of the signature. When the author adds a behavior to the memo that includes this participant, graphical document editor 232 displays the signature on the screen, while textual document editor 234 displays the reference to the signature image. Translations affect only how the document is displayed in graphical document editor 232.

When the author adds a behavior that references a participant containing a translation, participant source file parser 266 signals translation manager 262 when participant source file parser 266 detects the presence of translator 670 in participant source file 600.

Translation manager 262 receives the signal, and requests and receives search patterns 674 from participant source file parser 266. Search patterns 674 operate identically to search patterns 640, but are used by search text locator 226 to find the portion of the document that is to be rendered differently by graphical document editor 232.

Translation manager 262 requests and receives translations 676, translation 680-686, open tag 690, attribute 693-694, display 696, and close tag 698, and for each translation specified, builds an element consisting of an open tag containing each received attribute, a display, and a close tag, and stores the list of elements in local storage.

As graphical document editor 232 displays each object in the document in document storage 256, graphical document editor 232 requests a translation for the object from translation manager 262. Translation manager 262 scans the list of elements in local storage, and if translation manager 262 finds a translation for the object, translation manager 262 sends this element to graphical document editor 232. Graphical document editor 232 receives the element and displays the element instead of the object, as would a conventional browser.

In one embodiment, a translation may have a property inspector associated with it. A property inspector is a file that manages a process that provides an interface that allows the author to control various attributes of a translation. In one embodiment, property inspectors may be written or customized by the editor. A complete description of property inspectors may be found in "Dreamweaver UltraDev 4: The Complete Reference", by West, Muck, and Allen, Osborne/McGraw-Hill, 2001, ISBN 0-07-213017-2, which is hereby incorporated by reference herein in its entirety. When translation manager 262 sends graphical document editor 232 the translation element, it also includes the filename of the property inspector. Graphical document editor 232 executes the property inspector for display and acceptance of commands by the author.

Figure 3A:
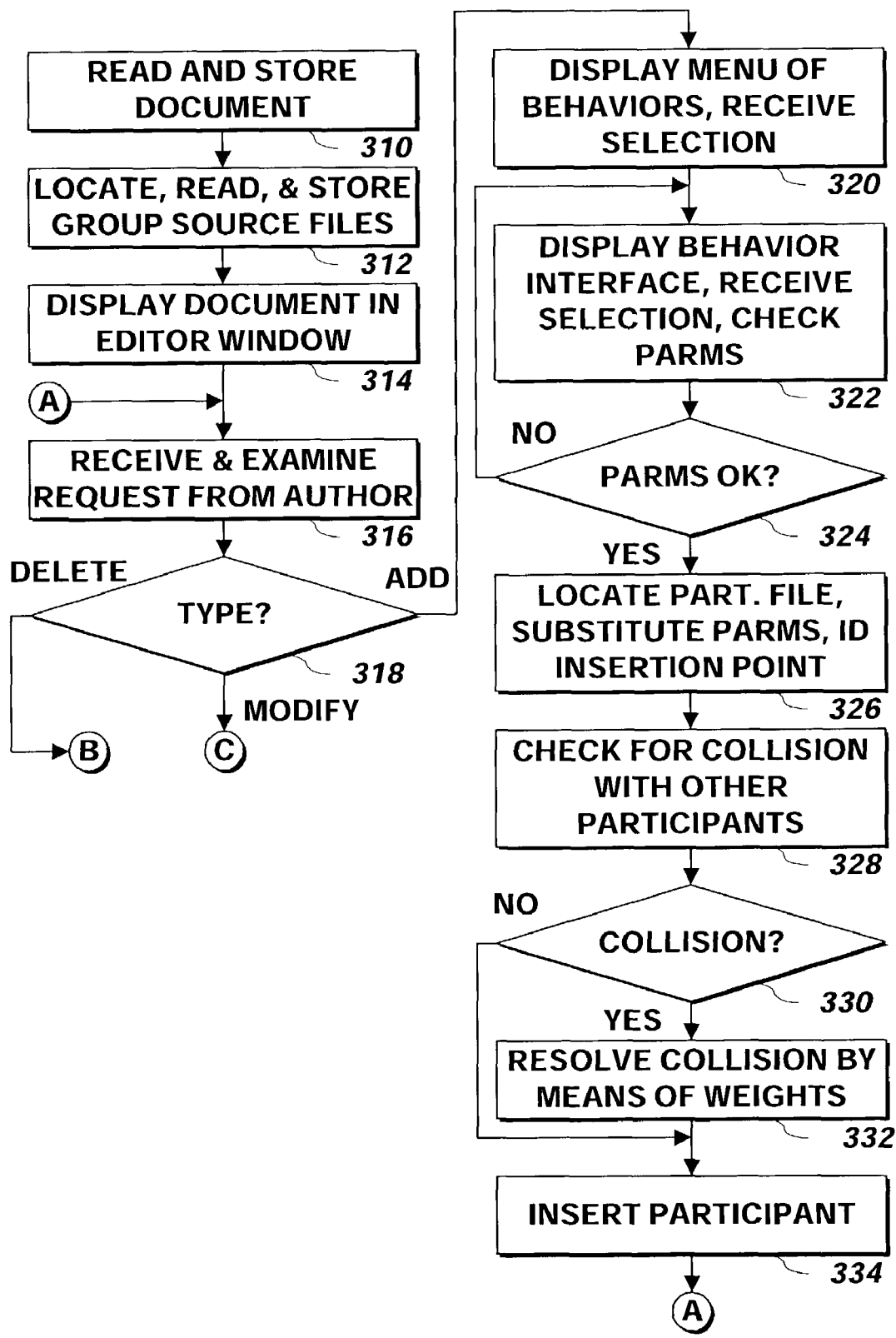
FIG. 3A is a flowchart illustrating a method of inserting objects into a document according to one embodiment of the present invention.

Referring now to FIG. 3A, a method of inserting objects into a document is shown according to one embodiment of the present invention. The document is read 310 and stored, and the group source files are located 312, read, and stored as described above. The document is displayed 314 in an editor window as described above. A request is received 316 and examined and its type checked, as described above.

If the request is an add request 318, the menu of behaviors is displayed 320 and the selection is received as described above. The behavior interface is displayed 322, the selection is received, and parameters checked as described above. If the parameters are not valid 324, the method continues with step 322. If the parameters are valid 324, the participant file is located 326, parameters are substituted, and insertion point is identified as described above.

A check is made 328 for collisions with other participants as described above. If such a collision is found 330, the collision is resolved 332 using weights as described above, and the method continues with step 334.

If a collision was not found 330, then the participant is inserted 334 as described above, and the method continues with step 316.

Figure 3B:
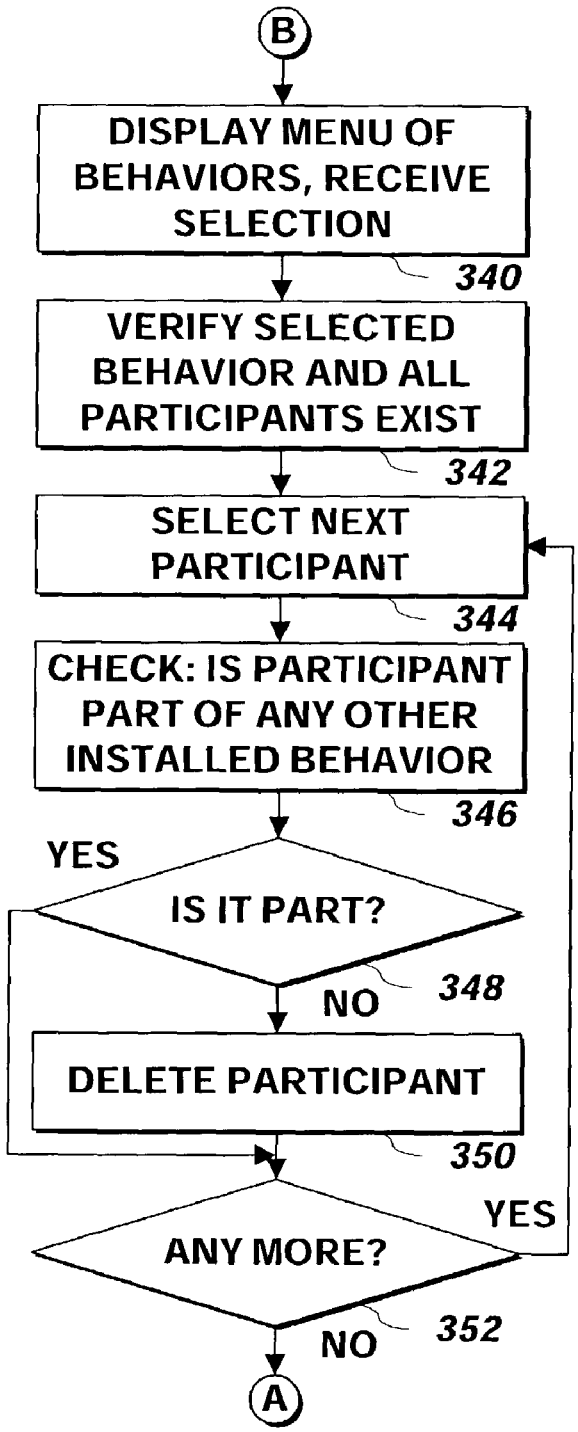
FIG. 3B is a flowchart illustrating a method of deleting objects from a document according to one embodiment of the present invention.

If the request is a delete request 318, the method continues with step 340 of FIG. 3B, a method of deleting objects from a document according to one embodiment of the present invention. A menu of behaviors is displayed 340 and the selection is received as described above. The existence of the behaviors and all participants is verified 342, and the next participant is selected 344 as described above. A check is made 346 to see if the selected participant is part of any other installed behavior as described above. If it is not part 348, then the participant is deleted 350 as described above, and the method continues with step 352. If the participant is part of another installed behavior 348, then a check is made 352 for more participants. If more participants are found 352, then the method continues with step 344. If no more participants are found, and the method continues with step 316 on FIG. 3A.

Figure 3C:
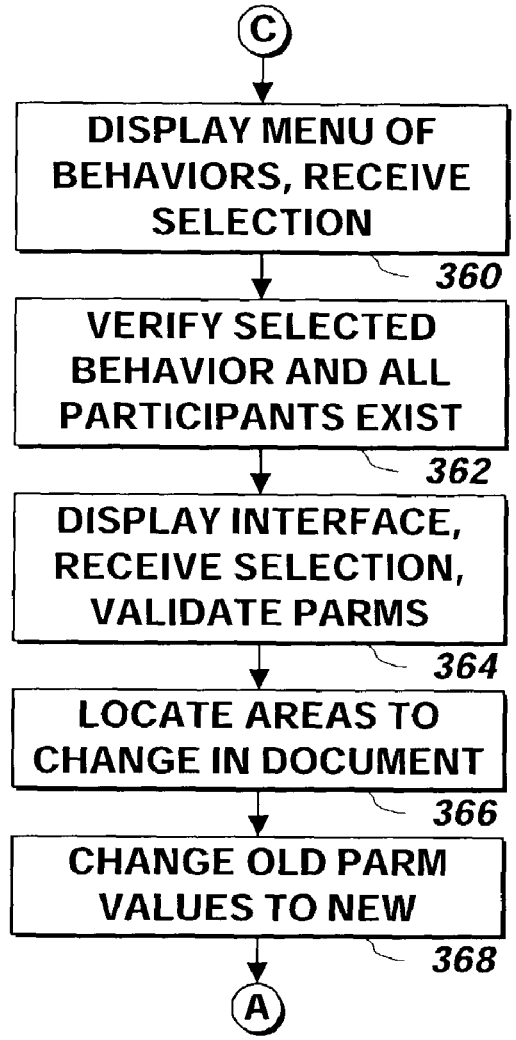
FIG. 3C is a flowchart illustrating a method of modifying objects in a document according to one embodiment of the present invention.

If the request is a modify request 318, the method continues with step 360 of FIG. 3C, a method of modifying objects in a document according to one embodiment of the present invention. A menu of behaviors is displayed 360 and the selection is received as described above. The existence of the behaviors and all participants is verified 362 as described above. The behavior interface is displayed 364, the selection is received, and parameters are validated as described above. The areas to change are located 366 in the document, and old parameter values are changed 368 to new values as described above, and the method continues with step 316 on FIG. 3A.

Figure 4A:
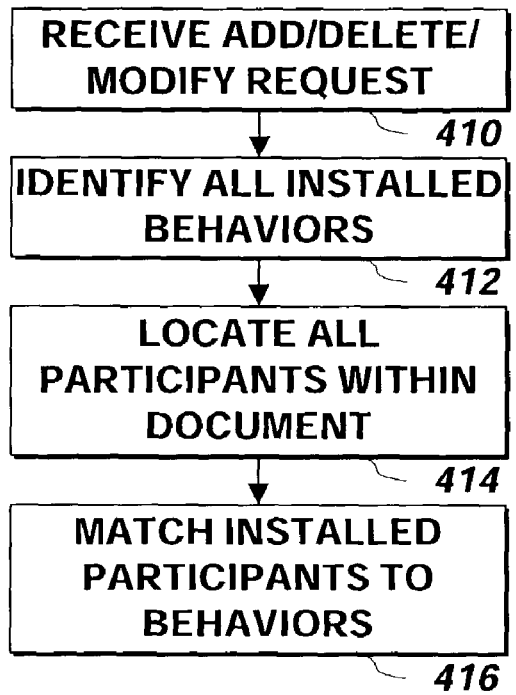
FIG. 4A is a flowchart illustrating a method of matching installed participants to behaviors according to one embodiment of the present invention.

Referring now to FIG. 4A, a method of matching installed participants to behaviors is shown according to one embodiment of the present invention. The add, delete, or modify request is received 410, and all installed behaviors are identified 412 as described above. All participants are located 414 within the document, and installed participants are matched 416 to their behaviors as described above.

Figure 4B:
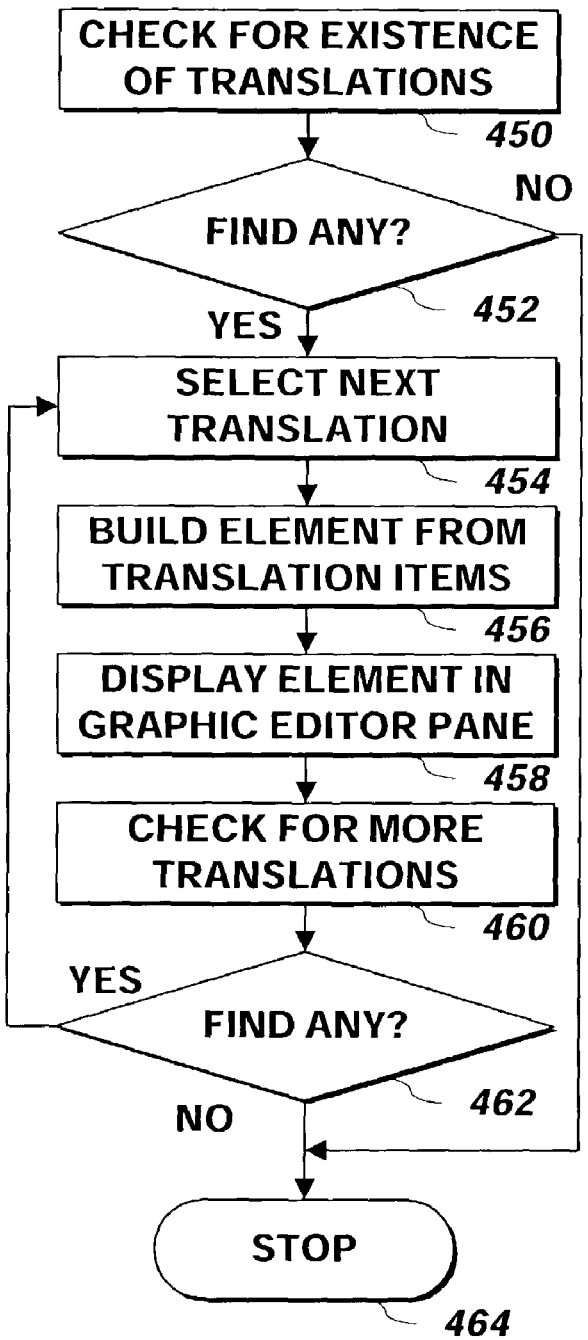
FIG. 4B is a flowchart illustrating a method of identifying and displaying object translations according to one embodiment of the present invention.

Referring now to FIG. 4B, a method of identifying and displaying object translations is shown according to one embodiment of the present invention. A check is made 450 for the existence of translations as described above. If none are found 452, then the method returns 464. If any translations are found 452, the next translation is selected 454, and an element is built 456 from several translation items as described above. The element is displayed 458 in the graphic editor pane, and a check is made for more translations 460 as described above. If more translations are found 462 then the method continues with step 454. If no more translations are found 462 then the method terminates 464.

APPENDIX A

<group serverBehavior="value" dataSource="value" subType="value">
  <title>value</title>
  <groupParticipants selectParticipant="value">

```
<groupParticipant name="value" partType="value"/>
<groupParticipant name="value" partType="value"/>
...
    </groupParticipants>
</group>
```

APPENDIX B

```
<participant>
    <implementation serverModel="value">
        <quickSearch> value </quickSearch>
        <insertText location="value" nodeParamName="value">
value </insertText>
        <searchPatterns whereToSearch="value">
            <searchPattern paramNames="value" limitSearch="value"
                           isOptional="value"> value
</searchPattern>
            <searchPattern paramNames="value" limitSearch="value"
                           isOptional="value"> value
</searchPattern>
            ...
        </searchPatterns>
        <updatePatterns>
            <updatePattern paramName="value"> value
</updatePattern>
            <updatePattern paramName="value"> value
</updatePattern>
        </updatePatterns>
        <delete deleteType="value" />
        <translator>
            <searchPatterns> ... </searchPatterns>
            <translations>
                <translation whereToSearch="value"
limitSearch="value">
                    <openTag> value </openTag>
                    <attributes>
                        <attribute> value </attribute>
                        <attribute> value </attribute>
                        ...
                    </attributes>
                    <display> value </display>
                    <closeTag> value </closeTag>
                <translation>
                <translation whereToSearch="value"
limitSearch="value">
                    ...
                <translation>
                ...
            <translations>
        <translator>
    </implementation>
    <implementation serverModel="value">
        ...
    </implementation>
    ...
</participant>
```

What is claimed is:

1. A method of editing a first file, comprising:
reading the first file;
reading at least one second file comprising at least one behavior describing changes that may be made to the first file, wherein the at least one behavior includes at least one participant designated by an expert for use in editing the first file;
providing for display a menu of identifiers comprising an identifier for the at least one behavior referenced in the at least one second file;
receiving a selection of the identifier, by an operator, for the at least one behavior from the menu of identifiers provided, wherein the operator is different from the expert; and
responsive to the selection of the identifier for the at least one behavior:
determining a location in the first file, the location corresponding to the at least one participant; and
editing the first file at the location corresponding to the at least one participant, wherein the editing is performed in accordance with the changes described by the at least one behavior corresponding to the selected identifier.

2. The method of claim 1 wherein:
the editing the first file comprises adding text corresponding to the at least one behavior.

3. The method of claim 2, wherein:
the text comprises at least one parameter; and
the adding step comprises:
prompting for a value for each of the at least one parameter;
receiving the value for each of the at least one parameter; and
substituting the value in place of the parameter to which the value corresponds.

4. The method of claim 3 additionally comprising verifying the value received for at least one of the at least one parameter.

5. The method of claim 2 wherein:
the at least one participant location comprises at least one weight; and
the adding step is responsive to the at least one weight of the at least one participant location, and at least one weight of another participant location associated with the at least one behavior.

6. The method of claim 1 wherein the location comprises a selection made by the operator.

7. The method of claim 1 wherein the location comprises a document object model location.

8. The method of claim 1 wherein the location comprises at least one predefined text string in the first file.

9. The method of claim 1 wherein:
the editing the first file comprises modifying, in the first file, text corresponding to the at least one behavior.

10. The method of claim 9 wherein the modifying step comprises:
identifying at least one parameter corresponding to the at least one behavior;
locating, in the first file, a current value of each of the at least one parameter in the text corresponding to the at least one behavior;
for each of said at least one parameter, receiving a new value; and
for each of said at least one parameter, substituting, in the text corresponding to the at least one behavior, the new value for the current value, in the first file.

11. The method of claim 10 additionally comprising, for at least one of the at least one parameter, verifying the new value received.

12. The method of claim 1, wherein:
the editing the first file comprises deleting, in the first file, text corresponding to the at least one behavior.

13. The method of claim 1, wherein:
the steps of the method are performed by a computer program; and
the first file and the second file are external to the computer program.

14. A computer program product comprising a computer useable medium having computer readable program code embodied therein for editing a first file, the computer program product comprising computer readable program code devices configured to cause a computer to:

read the first file;

read at least one second file comprising at least one behavior describing changes that may be made to the first file, wherein the at least one behavior includes at least one participant designated by an expert for use in editing the first file;

provide for display a menu of identifiers comprising an identifier for the at least one behavior referenced in the at least one second file;

receive a selection of the identifier, by an operator, for the at least one behavior from the menu of identifiers provided, wherein the operator is different from the expert; and responsive to the selection of the identifier for the at least one behavior:

determine a location in the first file, the location corresponding to the at least one participant; and edit the first file at the location corresponding to the at least one participant, wherein the editing is performed in accordance with the changes described by the at least one behavior corresponding to the selected identifier.

15. The computer program product of claim 14 wherein:
the computer readable program code devices configured to cause the computer to edit the first file comprise computer readable program code devices configured to cause the computer to add text corresponding to the at least one behavior.

16. The computer program product of claim 15, wherein:
the text comprises at least one parameter; and
the computer readable program code devices configured to cause the computer to add comprise computer readable program code devices configured to cause the computer to:
prompt for a value for each of the at least one parameter;
receive the value for each of the at least one parameter; and
substitute the value in place of the parameter to which the value corresponds.

17. The computer program product of claim 16 additionally comprising computer readable program code devices configured to cause the computer to verify the value received for at least one of the at least one parameter.

18. The computer program product of claim 15 wherein:
the at least one participant location comprises at least one weight; and
the computer readable program code devices configured to cause the computer to add are responsive to the at least one weight of the at least one participant location, and at least one weight of another participant location associated with the at least one behavior.

19. The computer program product of claim 14 wherein the location comprises a selection made by the operator.

20. The computer program product of claim 14 wherein the location comprises a document object model location.

21. The computer program product of claim 14 wherein the location comprises at least one predefined text string in the first file.

22. The computer program product of claim 14 wherein:
computer readable program code devices configured to cause the computer to edit the first file comprise computer readable program code devices configured to cause the computer to modify, in the first file, text corresponding to the at least one behavior.

23. The computer program product of claim 22 wherein the computer readable program code devices configured to cause the computer to modify comprise computer readable program code devices configured to cause the computer to:

identify at least one parameter corresponding to the at least one behavior;

locate, in the first file, a current value of each of the at least one parameter in the text corresponding to the at least one behavior;

for each of said at least one parameter, receive a new value; and for each of said at least one parameter, substitute, in the text corresponding to the at least one behavior, the new value for the current value, in the first file.

24. The computer program product of claim 23 additionally comprising, computer readable program code devices configured to cause the computer to, for at least one of the at least one parameter, verify the new value received.

25. The computer program product of claim 14, wherein:
the computer readable program code devices configured to cause the computer to edit the first file comprise computer readable program code devices configured to cause the computer to delete, in the first file, text corresponding to the at least one behavior.

26. The computer program product of claim 14, wherein the first file and the second file are separate from the computer program product.

27. A system for editing a first file, comprising:
a processor; and
a computer program product encoded on a computer-readable medium, the computer program product configured to cause the processor to perform operations comprising:
reading the first file;
reading at least one second file comprising at least one behavior describing changes that may be made to the first file, wherein the at least one behavior includes a contiguous block of text designated by an expert for use in editing the first file;
providing for display a menu of identifiers comprising an identifier for the at least one behavior referenced in the at least one second file;
receiving a selection of the identifier, by an operator, for the at least one behavior from the menu of identifiers provided, wherein the operator is different from the expert; and
responsive to the selection of the identifier for the at least one behavior:
determining a location in the first file, the location corresponding to the contiguous block of text;
editing the first file at the location corresponding to the contiguous block of text, wherein the editing is performed in accordance with the changes described by the at least one behavior corresponding to the selected identifier.

28. The system of claim 27 wherein:
the editing the first file comprises adding text corresponding to at least one behavior.

29. The system of claim 28, wherein:
the text comprises at least one parameter; and
the adding step comprises:
prompting for a value for each of the at least one parameter;
receiving the value for each of the at least one parameter; and
substituting the value in place of the parameter to which the value corresponds.

30. The system of claim 29 additionally comprising verifying the value received for at least one of the at least one parameter.

31. The system of claim 28 wherein:
the location of the contiguous block of text comprises at least one weight; and
the adding step is responsive to the at least one weight of the location of the contiguous block of text, and at least one weight of the location of another contiguous block of text associated with the at least one behavior.

32. The system of claim 27 wherein the location comprises a selection made by the operator.

33. The system of claim 27 wherein the location comprises a document object model location.

34. The system of claim 27 wherein the location comprises at least one predefined text string in the first file.

35. The system of claim 27 wherein:
the editing the first file comprises modifying, in the first file, text corresponding to the at least one behavior.

36. The system of claim 35 wherein the modifying step comprises:
identifying at least one parameter corresponding to the at least one behavior;
locating, in the first file, a current value of each of the at least one parameter in the text corresponding to the at least one behavior;
for each of said at least one parameter, receiving a new value; and
for each of said at least one parameter, substituting, in the text corresponding to the at least one behavior, the new value for the current value, in the first file.

37. The system of claim 36 additionally comprising, for at least one of the at least one parameter, verifying the new value received.

38. The system of claim 27, wherein:
the editing the first file comprises deleting, in the first file, text corresponding to the at least one behavior.

* * * * *